US 12,089,197 B2

(12) United States Patent
Olson

(10) Patent No.: US 12,089,197 B2
(45) Date of Patent: Sep. 10, 2024

(54) CENTRAL CONTROL UNIT, RADIO UNIT AND METHODS IN A WIRELESS COMMUNICATIONS NETWORK

(71) Applicant: Telefonaktiebolaget LM Ericsson (publ), Stockholm (SE)

(72) Inventor: Henrik Olson, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 341 days.

(21) Appl. No.: 17/604,531

(22) PCT Filed: Apr. 17, 2019

(86) PCT No.: PCT/SE2019/050360
§ 371 (c)(1),
(2) Date: Oct. 18, 2021

(87) PCT Pub. No.: WO2020/214072
PCT Pub. Date: Oct. 22, 2020

(65) Prior Publication Data
US 2022/0210795 A1    Jun. 30, 2022

(51) Int. Cl.
*H04W 72/00* (2023.01)
*H04W 72/12* (2023.01)

(52) U.S. Cl.
CPC .................................. *H04W 72/12* (2013.01)

(58) Field of Classification Search
None
See application file for complete search history.

(56) References Cited

U.S. PATENT DOCUMENTS

2019/0007246 A1*   1/2019   Fertonani ................ H04L 65/40

OTHER PUBLICATIONS

Ericsson, "R1-1900997: UL signals and channels for NR-U," Third Generation Partnership Project (3GPP), TSG-RAN WG1 Meeting Ad Hoc 1901, Jan. 21-25, 2019, 18 pages, Taipei, Taiwan.
International Search Report and Written Opinion for International Patent Application No. PCT/SE2019/050360, mailed Jan. 2, 2020, 17 pages.

* cited by examiner

*Primary Examiner* — Abdelillah Elmejjarmi
(74) *Attorney, Agent, or Firm* — Withrow & Terranova PLLC

(57) ABSTRACT

An uplink transmission energy from the one or more UEs is detected and it is decided whether the detected uplink transmission energy from the respective one or more UEs is above or below a first threshold. When the detected uplink transmission energy from any of the one or more UEs is above the first threshold, the radio unit sends the FD data representing those respective one or more UEs to the central control unit. When the detected uplink transmission energy from any of the one or more UEs is below the first threshold, the radio unit sends a message to the central control unit which message indicates that no FD data will be sent representing those respective one or more UEs. The radio unit also refrains from sending the FD data representing those respective one or more UEs to the central control unit.

20 Claims, 15 Drawing Sheets

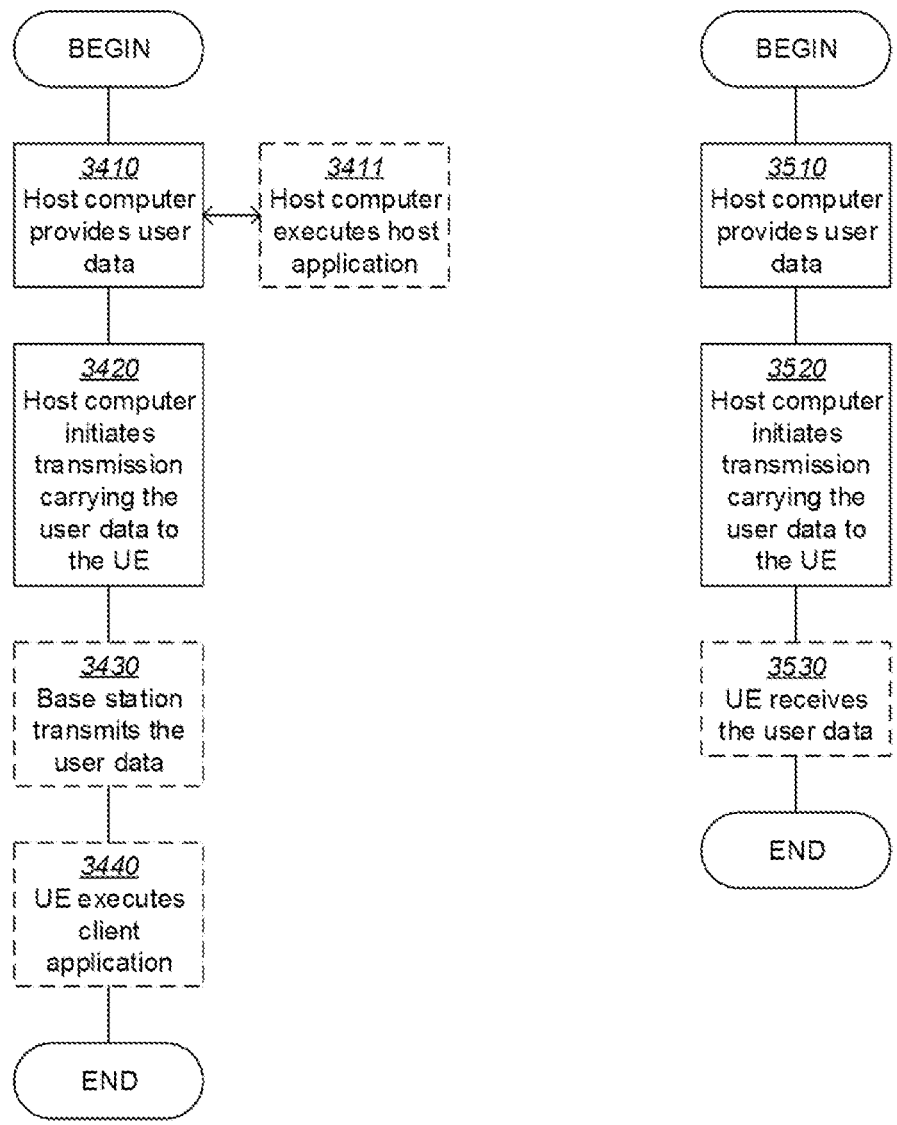

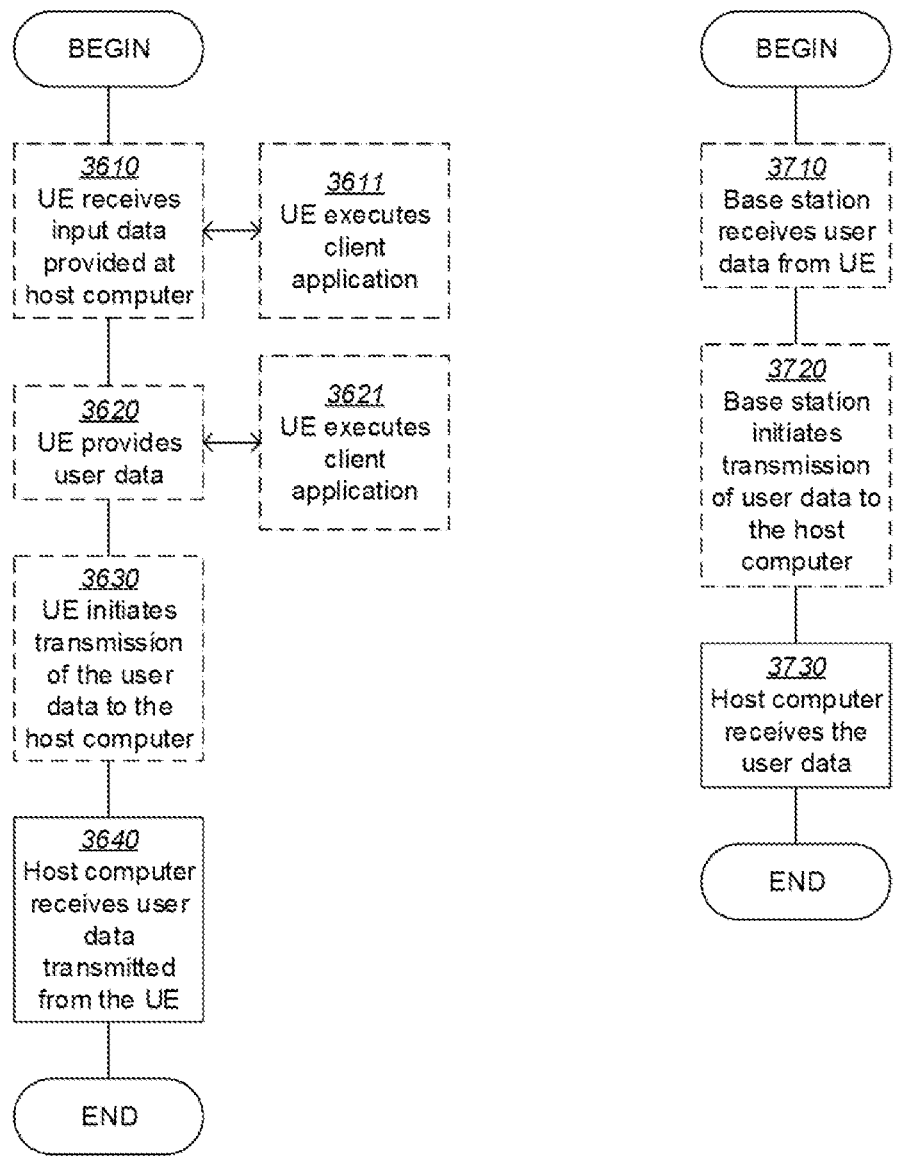
Fig. 16                    Fig. 17

CENTRAL CONTROL UNIT, RADIO UNIT AND METHODS IN A WIRELESS COMMUNICATIONS NETWORK

This application is a 35 U.S.C. § 371 national phase filing of International Application No. PCT/SE2019/050360, filed Apr. 17, 2019, the disclosure of which is incorporated herein by reference in its entirety.

TECHNICAL FIELD

Embodiments herein relate to a central control unit 110, a radio unit 111 and methods therein. In some aspects, they relate to handling Frequency Domain (FD) data between the central control unit 110 and the radio unit 111 in a wireless communications network 100.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Packet-Based Front-Haul

FIG. 1 schematically illustrates a Centralized Radio Access Network (C-RAN) 1. C-RAN is a cellular network architecture in which a central control unit 2 and one or more radio units 3 of a RBS, such as e.g. a gNB or eNB, are separated. The central control unit 2 is herein also referred to as a Baseband Unit (BBU) or Radio Equipment Controller (REC). The radio units 3 are herein also referred to as a Remote Radio Heads (RRH), Remote Radio Units (RRUs) or Radio Equipment's (RE). Each radio unit may comprise one or more antennas. A front-haul is a portion of the Centralized Radio Access Network (C-RAN) which acts as an intermediate link between the central control units 2 and the radio units 3 at the edge of the cellular network 1. Common Public Radio Interface (CPRI) is an industry cooperation which defines this interface between the central control unit 2 and the radio units 3. The data traffic has traditionally been transported by streaming over the front-haul. To enhance the support for 5G front-haul the CPRI specification has been updated by the infrastructure vendors to the so-called ethernet CPRI (eCPRI). The new specification now support packet-based data transport over the front-haul, such as e.g. Ethernet.

A functionality split has been launched as a low layer split for massive digital beamforming based systems. Here eCPRI is used as a physical bearer of user plane data. With functionality split is herein meant a functionality split in an RBS with multi-antenna-element radio (e.g. greater or equal to 16 antenna elements) where the beamforming operation and OFDM symbol processing, such as downlink IFFT and uplink FFT, has been moved from the central control unit to the radio unit. In this lower layer split, the radio unit 3 performs a substantial data expansion and/or reduction implied by a massive digital beamforming operation, i.e. port expansion and port reduction in Downlink (DL) and Uplink (UL) respectively. This greatly reduces the required front-haul bandwidth, since less data need to be transmitted over the front-haul Studies have been performed to extend eCPRI to regular "few-antenna-element" base stations, i.e. systems where no beamforming is performed in the radio unit 3. This may be referred to as a C1 Frequency Domain (C1FD) split. With C1FD is herein meant a functionality split in an RBS with few-antenna-element radio, e.g. less than 16 antenna elements, where OFDM symbol processing, such as downlink IFFT and UL FFT, has been moved from the central control unit to the radio unit.

The radio unit 3 will then in the DL direction receive packetized frequency domain I/Q data on a per antenna basis. With I/Q data is herein meant the representation of the sine wave data in Cartesian coordinates having an imaginary Q-axis and a Real I-axis. With per antenna basis is herein meant that the data representing the I/Q samples to be sent on an antenna is sent over the front haul separated from data representing other antennas. The radio unit 3 will then reconstruct a frequency domain antenna buffer, perform the Orthogonal Frequency-Division (OFDM) Inverse Fast Fourier Transform (IFFT) on a symbol-by-symbol basis, perform a cyclic prefix addition, and then pass the data over a time domain streaming I/Q interface to a Digital Front End (DFE) of the radio unit 3. The DFE is the unit in the radio that performs DL and UL channel filtering and carrier translation to and/or from the correct frequency position in the radio band.

In the UL direction, the reverse processing chain is applied. First, cyclic prefix removal is performed. The time domain streaming I/Q data from the DFE is then Fast Fourier Transformed (FFT:d) on a symbol-by-symbol and antenna-by-antenna basis and temporarily stored in frequency domain antenna buffers. Over the front-haul, the radio unit 3 will then send only the UL Resource Blocks (RBs) that have been requested by the central control unit 2.

It should be noted that in the DL direction, only the RB chunks with DL physical channel or physical signal content needs to be sent to the radio unit 3 as long as the radio unit 3 has a capability to reconstruct the full carrier spectrum from the received chunks before performing the symbol IFFT. With RB chunks is herein meant an integer number of consecutive resource blocks each with one or more non-zero resource elements.

Front-Haul Trunking

In all systems where only the RBs having actual content are transferred between the central control unit 2 and the radio unit 3, the required front-haul Bandwidth (BVV) for a given sector carrier will vary with the air interface load, for DL and UL respectively. With sector is herein meant a geographical area served by a radio unit 3. With sector carrier is thus herein meant the radio carrier for the specific sector.

In a switched front-haul, the central control unit 2 is connected to many different radio units 3 through a switching device 4, e.g. a switch. The switches 4 then become aggregation points to the same central control 2 unit for many radio units 3. Thus, with a switched front-haul statistical multiplexing effects can be obtained. These effects reduce the total amount of front-haul BW which is required between the central control unit 2 and the switch 4 compared to the total aggregated BW in the network 1 between the front-haul switch 4 and the radio units 3. Each front-haul link between a switch 4 and a radio unit 3 needs to be dimensioned to handle the BW required for the peak rate of UL and DL transmissions.

The statistical multiplexing effects are here referred to as trunking. It is worth mentioning that trunking gains may be achieved even closer to the radio unit 3 if an antenna site switch is introduced into the network 1.

Instant Uplink Access

In both LTE and NR systems, access latency improvements are continuously being addressed. One critical area of improvement is to reduce the waiting time for UL packet transmissions. This pertains to both UL user data and UL flow control information such as Transmission Control Protocol (TCP) Acknowledgment (ACK) information. Instant uplink Access (IUA) is a proposed solution to this problem where a given uplink transmission may take place without a prior dedicated request-grant phase which otherwise is the normal UL shared channel utilization procedure.

Pre-scheduling and grant-free transmissions are techniques discussed in order to achieve IUA. Both methods imply speculative UL scheduling in order to remove the waiting time induced by the Scheduling Request (SR) procedure. By speculative UL scheduling is herein meant a pre-emptive scheduling of UL resources prior to the UE actually having data to transmit in the UL, i.e. in anticipation of having data to transmit.

UL Coordinated Multi-Point Reception

The eNB or gNB data detection of a PUSCH transmission may be improved by UL Coordinated Multi-Point reception (UL CoMP) of the signal. In UL CoMP, the energy of the UE's PUSCH transmission is captured in multiple sectors and is combined in the receiver. FIG. 2 schematically illustrates UL CoMP. In FIG. 2 a UE 5 is shown. A PUSCH transmission from the UE 5 is received in three sectors: A primary sector 6 in a primary antenna site 7, a secondary sector 8 in the primary antenna site 7, and a secondary sector 9 in a secondary antenna site 10. With primary sector is herein meant the sector of the cell to which the UE has attached using e.g. a random access procedure. With secondary sector is herein meant a sector to which the RBS, from previous UE transmissions, has detected useful energy. The transmission path for the primary sector 6 is shown in a solid line and the transmission paths for the secondary sectors 8, 9 are shown in dashed lines. If all the data, e.g. I/Q data, representing the PUSCH resource blocks (RBs) for these three sectors 6, 8, 9 is made available at the central control unit 2, the PUSCH signal-to-noise ratio of the UE 5 can be maximized by multi-sector combining which is beneficial for the decoding of user data.

For an eCPRI based front-haul, only the OFDM symbols and resource blocks which have been requested by the central control unit will be sent to the central control unit. If the front-haul of the system is dimensioned with the assumption that trunking gains are always available due to there always being cells with low load, then not all available symbols and RBs from all cells can be made available to the central control unit. If an air interface scheduler, at low load, employs IUA techniques to speculatively schedule UEs for PUSCH transmissions it implies that the central control unit will request data from all the speculatively scheduled UEs. The implied aggregated UL front-haul data can then exceed the amount of data which the front-haul has been dimensioned to handle.

In addition, if all PUSCH transmissions request CoMP data from all relevant CoMP sectors, the amount of data that needs to be transmitted to the eNb and/or gNb, such as e.g. to the central control unit 2, becomes even larger. Thus, the front-haul may in worst case scenarios be overloaded with the result that FD data for RBs on OFDM symbols for primary sectors may not be sent across the fronthaul which reduces the quality of service of the network.

SUMMARY

An object of embodiments herein is to improve the performance in a wireless communications network using IUA and switched front-haul.

As part of developing embodiments herein the inventors have identified a problem. When using pre-emptive scheduling in IUA in a network, since the scheduling is speculative, most of the time the UE will not have any data to transmit in the UL. The implication of this is then that many scheduled transmissions will not take place. This introduces the possibility of overbooking the UL air interface at low load. That is to say that more Physical Uplink Shared Channel (PUSCH) transmissions from different UEs than can be received with good signal quality are scheduled on the air interface. However, as has been explained, from a statistical point of view most of these transmissions will not be performed. Therefore, the scheduled UE transmissions that are actually transmitted can be received anyway in spite of the interface being overbooked. Thus most of the PUSCH receivers in the central control unit 2 configured to receive the UE data will detect Discontinuous transmission (DTX), i.e. that there is no or at least not enough signal energy to receive the PUSCH transport block. The front-haul may also be limiting if dimensioned for an average cell load less than the amount of spectrum speculatively scheduled by the air interface scheduler for IUA, e.g. in the case that that UEs are scheduled on different RBs, i.e. only frequency domain multiplexing of UEs.

According to a first aspect of embodiments herein, the object is achieved by a method performed by radio unit for handling Frequency Domain, FD, data representing one or more User Equipments, UEs, to a central control unit associated with the radio unit in a wireless communications network. The communications network comprises a switched fronthaul.

The radio unit detects an uplink transmission energy from the one or more UEs. The radio unit then decides whether the detected uplink transmission energy from the respective one or more UEs is above or below a first threshold. When it is decided that the detected uplink transmission energy from any of the one or more UEs is above the first threshold, the radio unit sends the FD data representing those respective one or more UEs to the central control unit. When it is decided that the detected uplink transmission energy from any of the one or more UEs is below the first threshold, the radio unit sends a message to the central control unit. The message indicates that no FD data will be sent representing those respective one or more UEs. Furthermore, the radio unit also refrains from sending the FD data representing those respective one or more UEs to the central control unit.

According to a second aspect of embodiments herein, the object is achieved by a method performed by a central control unit for handling FD data representing one or more User Equipments, UEs, to the central control unit in a wireless communications network. The communications network comprises a switched fronthaul. Furthermore, the central control unit is associated with at least one radio unit and communicates via the at least one radio unit with the one or more UEs.

The central control unit sends a configuration to the respective at least one radio unit. The configuration is for configuring the respective at least one radio unit. The configuration configures the at least one ratio unit to: when it is decided that a detected uplink transmission energy from any of the one or more UEs is above a first threshold, send the FD data representing those respective one or more UEs to the central control unit. The configuration furthermore configures the at least on radio unit to: when it is decided that a detected uplink transmission energy from any of the one or more UEs is below the first threshold, send a message to the central control unit and refrain from sending the FD data representing those respective one or more UEs to the central control unit. The message indicates that no FD data will be sent representing those respective one or more UEs to the central control unit.

According to a third aspect of embodiments herein, the object is achieved by a radio unit for handling Frequency Domain, FD, data representing one or more User Equipments, UEs, to a central control unit associated with the radio unit in a wireless communications network. The communications network is adapted to a switched fronthaul. The radio unit is configured to:
  detect an uplink transmission energy from the one or more UEs, and
  decide whether the detected uplink transmission energy from the respective one or more UEs is above or below a first threshold, and when it is decided that the detected uplink transmission energy from any of the one or more UEs is above the first threshold, send the FD data representing those respective one or more UEs to the central control unit, and
  when it is decided that the detected uplink transmission energy from any of the one or more UEs is below the first threshold, send a message to the central control unit which message is adapted to indicate that no FD data will be sent representing those respective one or more UEs, and refrain from sending the FD data representing those respective one or more UEs to the central control unit.

According to a fourth aspect of embodiments herein, the object is achieved by a central control unit for handling FD data representing one or more User Equipment's, UEs, to the central control unit in a wireless communications network. The communications network is adapted to a switched fronthaul. The central control unit is adapted to be associated with at least one radio unit and is adapted to communicate via the at least one radio unit with the one or more UEs. The central control unit is configured to send to the respective at least one radio unit a configuration. The configuration is adapted for configuring the respective at least one radio unit to: when it is decided that a detected uplink transmission energy from any of the one or more UEs is above a first threshold, send the FD data representing those respective one or more UEs to the central control unit. The configuration is furthermore adapted for configuring the respective at least one radio unit to: when it is decided that a detected uplink transmission energy from any of the one or more UEs is below the first threshold, send a message to the central control unit and refrain from sending the FD data representing those respective one or more UEs to the central control unit. The message is adapted to indicate that no FD data will be sent representing those respective one or more UEs to the central control unit and.

Since FD data is only sent representing those UEs whose transmission energy is detected to be above the first threshold, the UL front-haul will not be loaded by data for transmissions that will not occur as a result of the UEs not having any data to transmit in the UL. This in turn results in an improved performance in the wireless communications network using IUA and switched front-haul.

BRIEF DESCRIPTION OF THE FIGURES

FIGS. 14-17 are flowcharts illustrating methods implemented in a communication system including a host computer, a base station and a user equipment.

DETAILED DESCRIPTION

Figure 1:
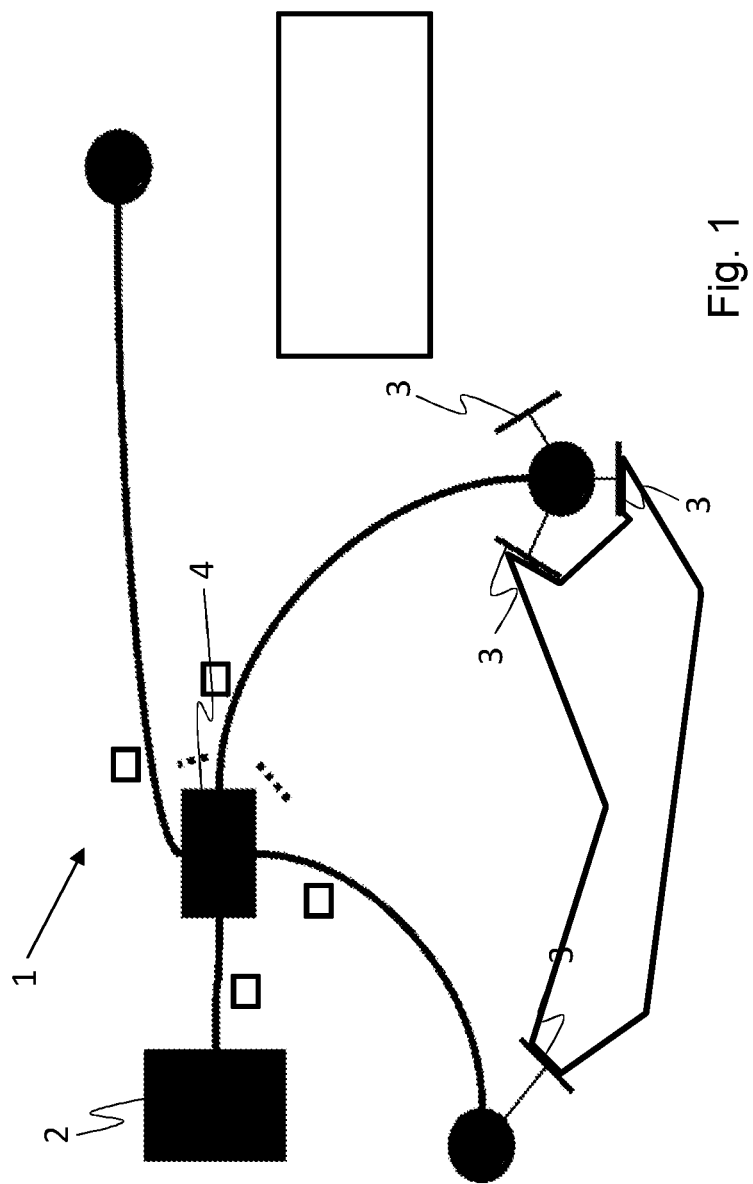
FIG. 1 is a schematic diagram illustrating C-RAN.
Figure 2:
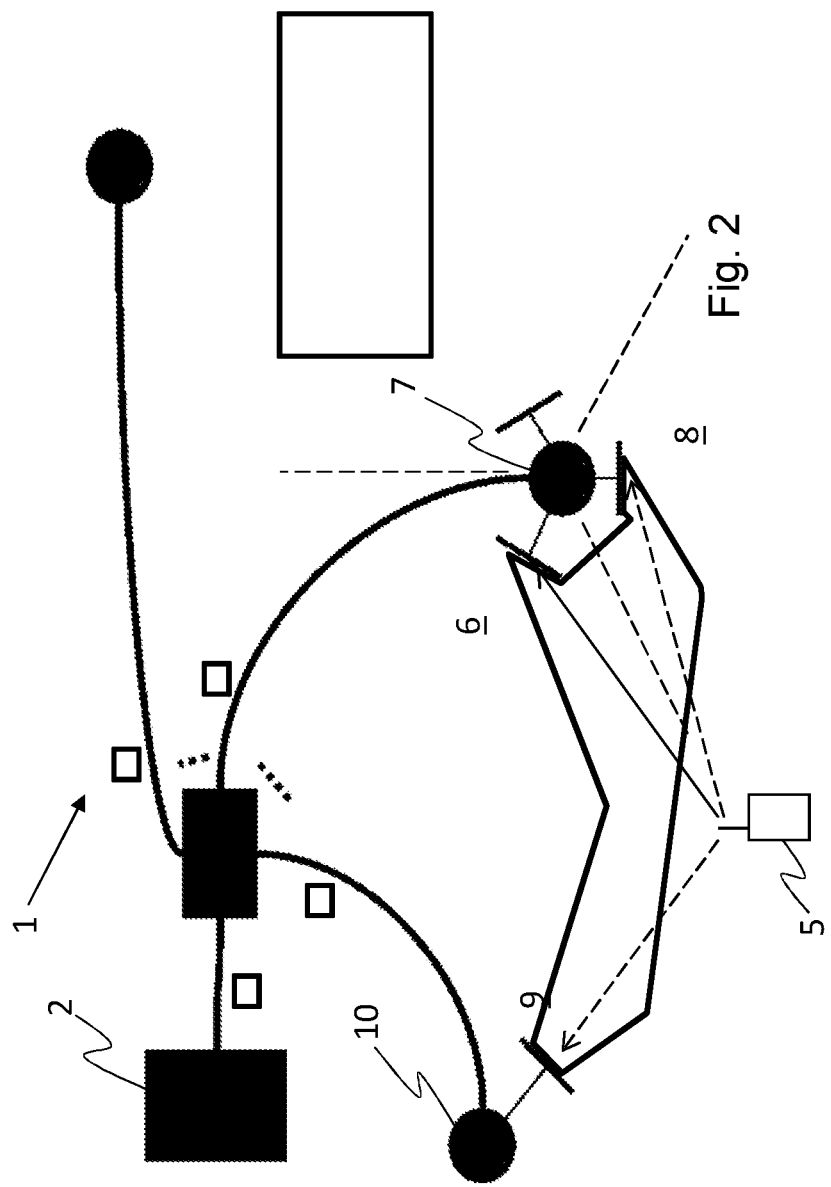
FIG. 2 is a schematic diagram illustrating UL CoMP.
Figure 3:
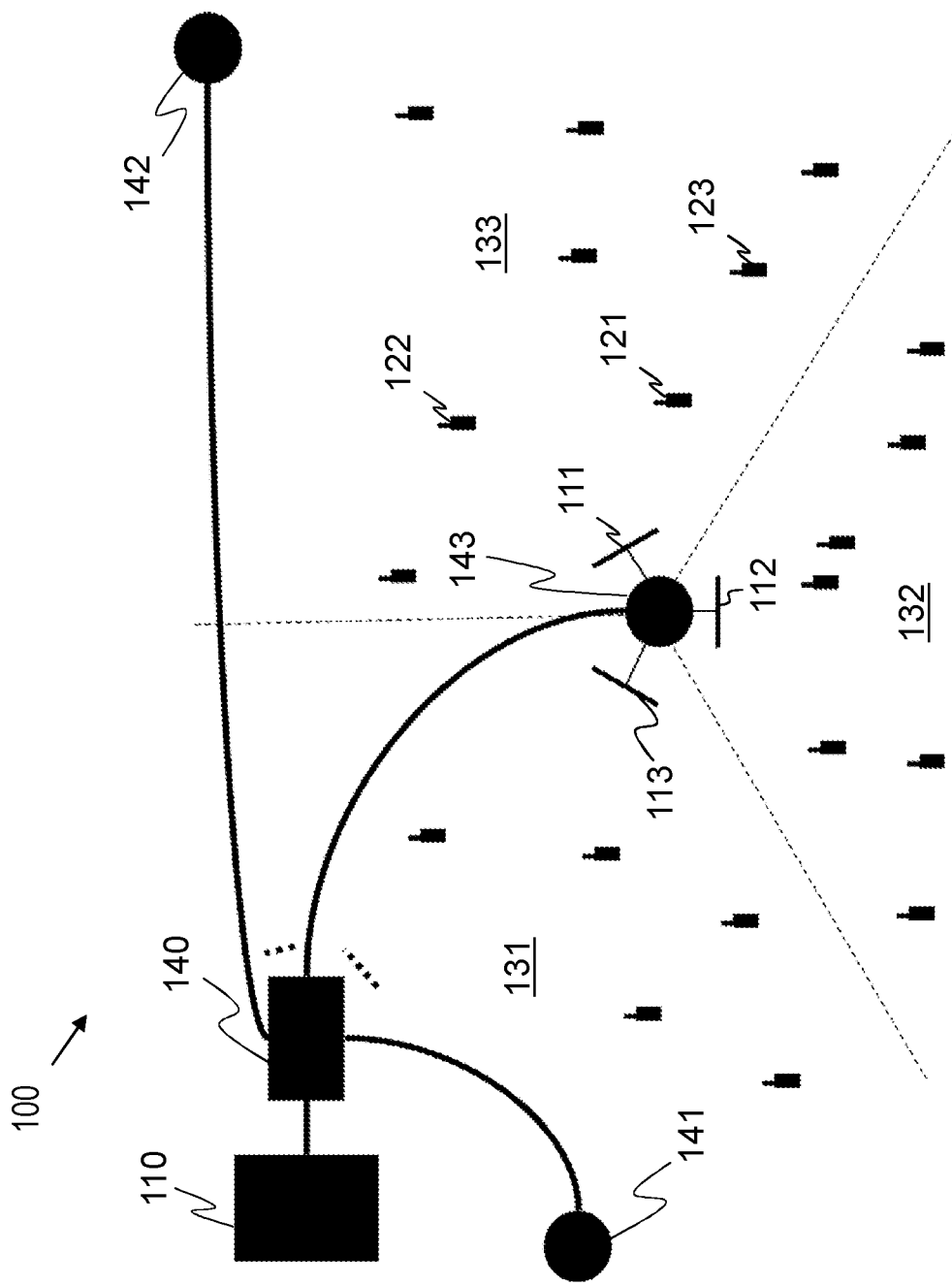
FIG. 3. is a schematic diagram illustrating embodiments of a wireless communications network.

FIG. 3 is a schematic overview depicting a wireless communications network 100 wherein embodiments herein may be implemented. The radio communications network 100 comprises one or more RANs and one or more CNs (not shown). The radio communications network 100 may use a number of different technologies, such as NB-IoT, CAT-M, Wi-Fi, eMTC, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

The wireless communications network 100 may comprise a central control unit 110. The central control unit 110 may e.g. be a base station, such as e.g. a radio base station such as a NodeB, an evolved Node B (eNB, eNode B) or a gNB. The central control unit 110 may herein also be referred to as baseband unit or radio equipment controller. The central control unit 110 may be connected to several antenna sites 141, 142, 143, e.g. through a front-haul switch 140. Thus, the front-haul to and from all antenna sites 141, 142, 143 may be connected to a switch 140 which in turn is connected to the central control unit 110, e.g. the baseband boards of the central control unit.

Each antenna site 141, 142, 143 may comprise at least one radio unit 111, 112, 113. The Radio units 111, 112, 113 operate in the radio communications network 100 providing radio coverage in a specific three-dimensional space, also referred to herein as a geographical area, a service area and a sector 131, 132, 133, using a radio access technology (RAT), such as 5G, LTE, NB-IoT, CAT-M, Wi-Fi, eMTC or similar. The front-haul to and from each radio unit 111, 112, 113 in the antenna site 141, 142, 143 may be aggregated in an antenna site switch. The radio unit may also be a communication unit, such as e.g. a CPRI-to-eCPRI conversion box, without radio but being associated to radio by being connectable to one or more radio units via CPRI. The conversion box may then terminates the IQ data to and/or from Digital Frontend (DFE) functions of the radio units and performs the part of the baseband processing that herein is allocated to the radio unit.

In the wireless communication network 100, wireless devices e.g. one or more UEs 121, 122, 123 operate.

The UEs 121, 122, 123 may each e.g. be a mobile station, a non-access point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more core networks (CN). It should be understood by the skilled in the art that "wireless device" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

FD data when used herein means the representation of the I/Q data of an OFDM symbol in the frequency domain, i.e. after cyclic prefix removal and FFT, using one complex valued number per resource element. Due to the nature of the uplink radio channel the FD data is a superposition of all transmitting UEs' data, other-cell interference and receiver noise.

The FD data is in some embodiments herein requested by the central control unit 110, this is since the actual PUSCH demodulator and decoder may be located in the central control unit 110. Each such demodulator needs a particular set of resource blocks of FD data.

In order to avoid transmitting data for scheduled transmissions which contain very low energy when IUA functions and switched eCPRI front-haul is deployed in a network 100, the radio units 111, 112, 113 may be equipped with hardware and software having the capability of detecting the transmission energy from the UEs 121, 122, 123 served by the radio unit 111, 112, 113. If the radio unit 111, 112, 113 detects that the uplink energy of one or more of the UEs 121, 122, 123 is above a first threshold, the FD data will be transmitted from the radio unit 111, 112, 113 to the central control unit 110. If the detected energy is instead below the first threshold, then the FD data is not sent representing the radio unit 111, 112, 113. Instead a message indicating that no FD data will be sent is transmitted to the central control unit 110. In this way, data transmitted from the UEs 121, 122, 123 having low energy is not transmitted from the radio unit 111, 112, 113 and thereby the load on the front-haul is reduced.

Figure 4:
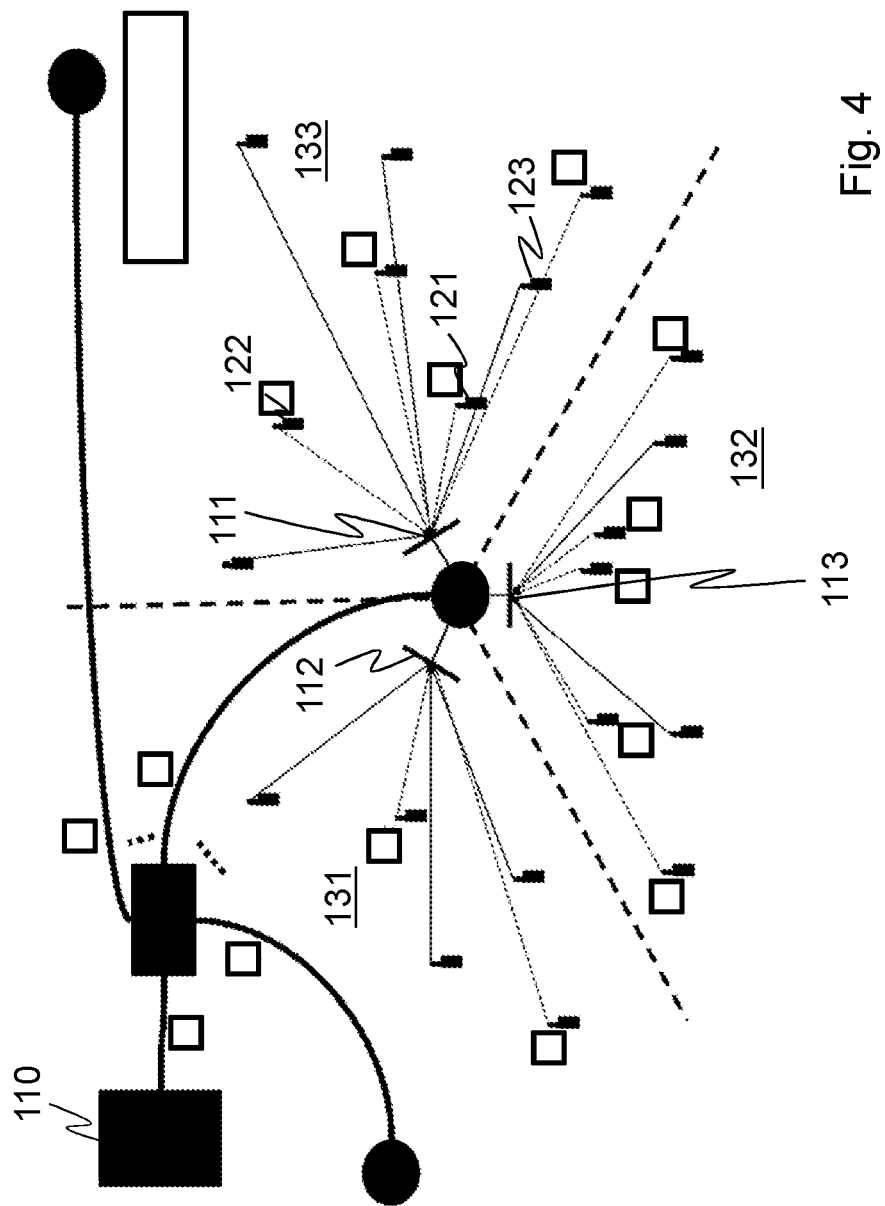
FIG. 4. is a schematic diagram illustrating embodiments of a wireless communications network.

FIG. 4 schematically illustrates an aggressive IUA strategy where an example embodiment of the method described above is used. Aggressive when used herein means that a very high proportion of the UEs 121, 122, 123 are scheduled for UL transmission In FIG. 4 all of the UEs 121, 122, 123 are scheduled for UL transmission. All of the connected and active UEs 121, 122, 123 in all sectors 131, 132, 133 are given an UL transmission grant during a slot. These grants are represented by the dashed and solid lines. However only some of the UEs 121, 122, 123 utilize the grant, these are represented by the solid lines. The other UEs 121, 122, 123, which are represented by the dashed lines, do not utilize the grant. The UEs 121, 122, 123 utilizing the grant will be detected to transmit UL energy above the first threshold, and will be transmitted by the radio unit 111, 112, 113 to the central control unit 110. Thus, only this subset of the RBs will be sent back to the central control unit 110 across the pooled front-haul.

Figure 5:
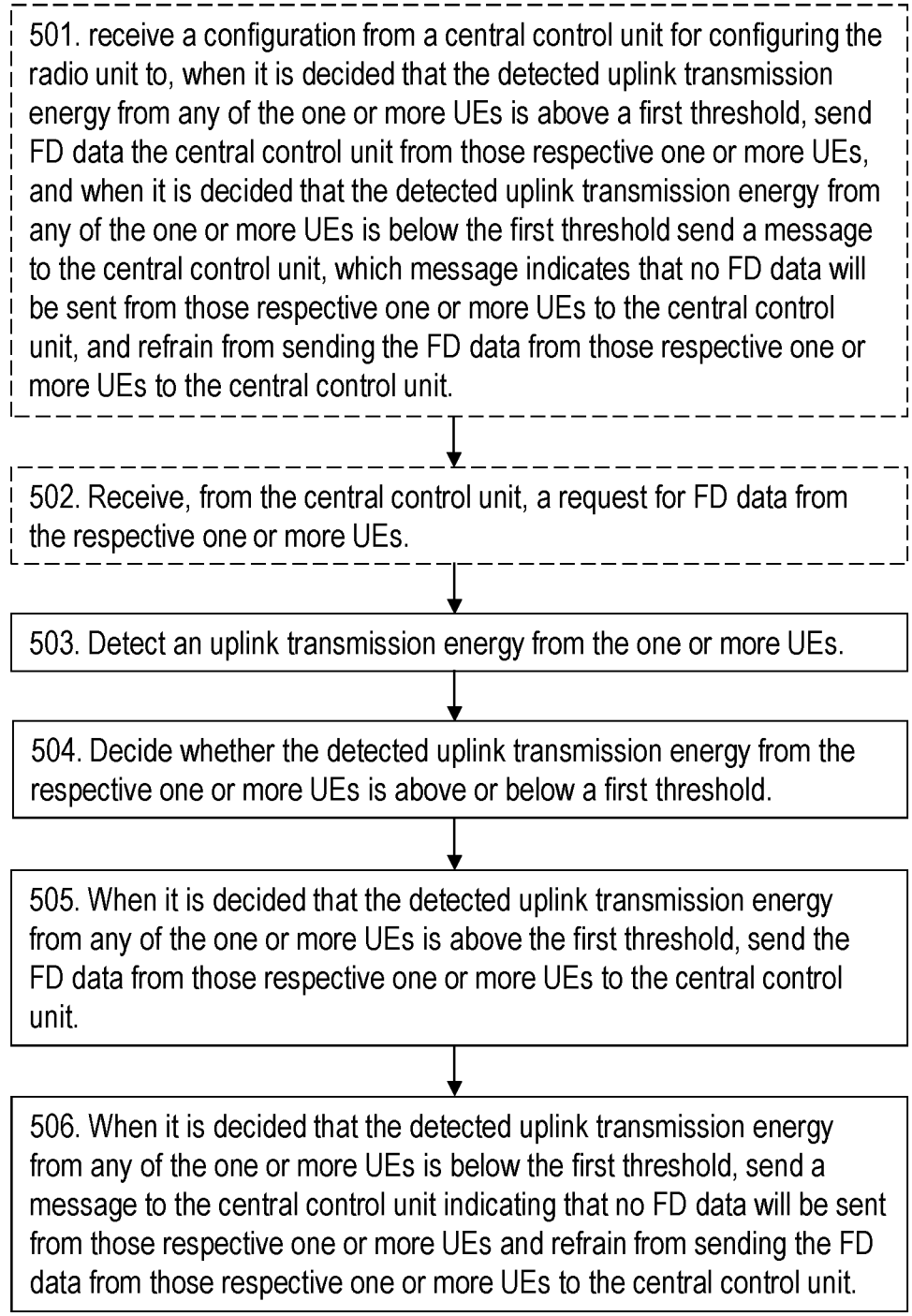
FIG. 5 is a flowchart depicting embodiments of a method in a radio unit.

Example embodiments of a method performed in the radio unit 111 for handling FD data representing the one or more UEs 121, 122, 123 to the central control unit 110 associated with the radio unit 111 in the wireless communications network 100 will now be described with reference to a flowchart depicted in FIG. 5. The communications network 100 comprises a switched front-haul and in some embodiments IUA, which may in some embodiments be referred to as the communications network 100 uses IUA and switched front-haul.

The method comprises the following actions, which actions may be performed in any suitable order. Dashed boxes represent optional method steps.

Action 501.

As an optional action, the radio unit 111 may be configured to perform the steps of detecting the transmission energy by receiving instructions from the central control unit 110.

Thus, the radio unit 111 may receive a configuration from the central control unit 110. The configuration may be for configuring the radio unit 111 to, when it is decided that the detected uplink transmission energy from any of the one or more UEs 121, 122, 123 is above a first threshold, send FD data to the central control unit 110 representing those respective one or more UEs 121, 122, 123. With the FD data representing the one or more UEs 121, 122, 123 may herein also be meant that the origin of the data is that one or more UE 121, 122, 123. The configuration may further be for configuring the radio unit 111 to send a message to the central control unit 110, which message indicates that no FD data will be sent representing those respective one or more UEs 121, 122, 123 to the central control unit 110 and refrain from sending the FD data representing those respective one or more UEs 121, 122, 123 to the central control unit 110 when it is decided that the detected uplink transmission energy from any of the one or more UEs 121, 122, 123 is below the first threshold.

Action 502.

The central control unit 110 may request FD data from the radio unit 111 in order to perform demodulation and decoding of the data transmitted by individual UEs 121, 122, 123. Thus, the radio unit 111 may receive, from the central control unit 110, a request for FD data representing the respective one or more UEs 121, 122, 123.

Action 503.

In order to decide whether the one or more UEs 121, 122, 123 actually had data to transmit in the UL the radio unit 111 will determine the amount of energy each of the one or more UEs 121, 122, 123 are transmitting. The radio unit 111 is therefore monitoring the energy of the incoming transmissions from the UEs 121, 122, 123.

Thus, the radio unit 111 detects an uplink transmission energy from the one or more UEs 121, 122, 123.

The uplink transmission from the respective one or more UEs 121, 122, 123 may e.g. be a PUSCH transmission.

Action 504.

Having detected the uplink transmission energy from the one or more UEs 121, 122, 123 the radio unit 111 will decide, e.g. judge, whether the detected amount of energy is great enough to warrant a transmission to the central control unit 110.

Thus, the radio unit 111 decides whether the detected uplink transmission energy from the respective one or more UEs 121, 122, 123 is above or below a first threshold. This may be performed by comparing the detected transmission energy to the first threshold. The radio unit 111 will then act differently depending on the outcome of the decision.

The first threshold may e.g. be a Discontinuous Transmission (DTX) threshold which is the received UE 121, 122, 123 signal energy level below which, when compared to the interference and noise energy level, the signal energy is too low to positively contribute to the demodulation and decoding of the data. The DTX threshold may be set differently depending on which modulation and rate matching has been used in the transmission. The threshold may also be set at an energy level below which the estimated received signal energy is so low that the transmission can be considered to not have occurred.

Action 505

If the detected energy is above the threshold, the data such as e.g. FD data should be transmitted to the central control unit 110, since when the transmission energy is detected to be above the threshold this is interpreted as the UE 121, 122, 123 is actually transmitting data. Note that the FD data may represent a specific UE 121, 122, 123 as discussed above.

Thus, when it is decided that the detected uplink transmission energy from any of the one or more UEs 121, 122, 123 is above the first threshold, the radio unit 111 sends the FD data representing those respective one or more UEs 121, 122, 123 to the central control unit 110. As an example, if the radio unit 111 detects UL transmission energy from UE 121 above the first threshold, the FD data representing UE 121 is sent to the central control unit 110.

The one or more UEs 121, 122, 123 may according to some embodiments be scheduled on the same set of RBs. In that case, when it is decided that the detected uplink transmission energy from any of the one or more UEs 121, 122, 123 is above the first threshold, the radio unit 111 sends the FD data to the central control unit 110. Thus, as long as one of the one or more UEs 121, 122, 123 scheduled on the same set of RBs, is detected to be transmitting at an energy which is above the first threshold, then the FD data is sent to the control unit 110.

Action 506

If the detected energy is below the threshold, the data such as e.g. the FD data should not be transmitted to the central control unit 110, since in this case it indicates that the UE 121, 122, 123 did not have any data to send. Instead a message indicating that the data will not be transmitted should be transmitted to the central control unit 110.

Thus, when it is decided that the detected uplink transmission energy from any of the one or more UEs 121, 122, 123 is below the first threshold, the radio unit 111 sends a message to the central control unit 110. The message indicates that no FD data will be sent representing those respective one or more UEs 121, 122, 123. Furthermore, the radio unit 111 refrains from sending the FD data representing those respective one or more UEs 121, 122, 123 to the central control unit 110.

Figure 6:
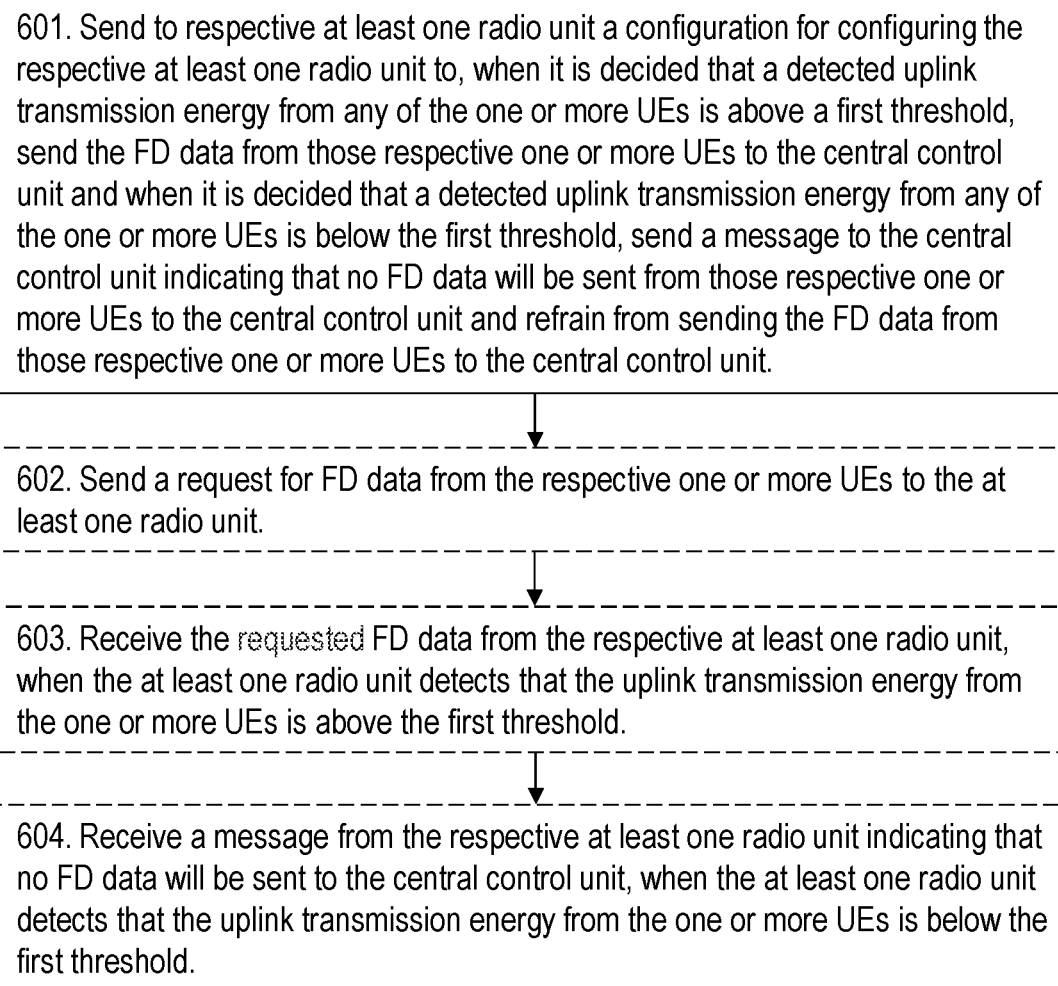
FIG. 6 is a flowchart depicting embodiments of a method in a central control unit.

Example embodiments of a method performed in the central control unit 110 for handling FD data representing the one or more UEs 121, 122, 123 to the central control unit 110 in the wireless communications network 100 will now be described with reference to a flowchart depicted in FIG. 6. The communications network 100 comprises a switched front-haul and in some embodiments IUA. The central control unit 110 is associated with at least one radio unit 111, 112, 113 and communicated with the at least one or more UEs 121, 122, 123 via the at least one radio unit 111, 112, 113.

The method comprises the following actions, which actions may be performed in any suitable order. Dashed boxes represent optional method steps.

Action 601.

The central control unit 110 sends to the respective at least one radio unit 111, 112, 113 a configuration for configuring the respective at least one radio unit 111, 112, 113. The configuration configures the at least one radio unit 111, 112, 113 to, when it is decided that a detected uplink transmission energy from any of the one or more UEs 121, 122, 123 is above a first threshold, send the FD data representing those respective one or more UEs 121, 122, 123 to the central control unit 110. Furthermore, the configuration configures the at least one radio unit 111, 112, 113 to, when it is decided that a detected uplink transmission energy from any of the one or more UEs 121, 122, 123 is below the first threshold, send a message to the central control unit 110. The message indicates that no FD data will be sent representing those respective one or more UEs 121, 122, 123 to the central control unit 110. In addition, in this case the configuration configures the at least one radio unit 111, 112, 113 to refrain from sending the FD data representing those respective one or more UEs 121, 122, 123 to the central control unit 110.

Thus, the at least one radio unit 111, 112, 113 will be configured accordingly. Thereby, when any of the one or more UEs 121, 122, 123 does have actual data to send, the at least one radio unit 111, 112, 113 is configured to send the corresponding FD data to the central control unit 110. Furthermore, when the at least one radio unit 111, 112, 113 does not have any FD data to send, the at least one radio unit 111, 112, 113 is instead configured to send a message indicating that no FD data will be sent. Thus, even if the UEs 121, 122, 123 are all pre-emptively scheduled for UL transmission the risk of overloading the network 100 is reduced considerably.

The one or more UEs 121, 122, 123 may according to some embodiments be scheduled on the same set of RBs. Then, the configuration configures the radio unit 111 to, when it is decided that the detected uplink transmission energy from any of the one or more UEs 121, 122, 123 is above the first threshold, send the FD data to the central control unit 110.

Thus, when the UEs 121, 122, 123 are scheduled on the same RB, it will be enough that one of the UEs 121, 122, 123 are transmitting at an UL energy level above the first threshold for the radio unit 110 to send the corresponding FD data to the central control unit 110.

The communications network 100 may according to some embodiments utilize CoMP and the at least on radio unit 111, 112, 113 comprises a plurality of radio units 111, 112, 113. A primary radio unit 111 out of the plurality of radio units 111, 112, 113 then serves a primary sector 131 for the central control unit 110. Secondary and primary sectors may be from the view of the UEs 121, 122, 123, i.e. one sector may be primary sector for one UE and secondary sector for another UE. One or more secondary radio units 112 out of the plurality of radio units 111, 112, 113 then serves one or more secondary sectors 132, 133 for the central control unit 110. The central control unit 110 sending to the at least one radio unit 111, 112, 113 a configuration for configuring the radio unit 111, 112, 113 then comprises to send to the primary radio unit 111 and the one or more secondary radio units 112 a respective configuration for configuring the primary radio unit 111 and the one or more secondary radio units 112. The configuration then configures the primary and secondary radio units 111, 112 to send FD data to the central control unit 110 when it is decided that a detected uplink transmission energy from the one or more UEs 121, 122, 123 is above a respective threshold associated with the radio unit 111, 112, 113. The configuration further configures the primary and secondary radio units 111, 112 to send a message to the central control unit 110, which message indicates that no FD data will be sent to the central control unit 110 and refrain from sending the FD data to the central control unit 110, when it is decided that the detected uplink transmission energy from the one or more UEs 121, 122, 123 is below the respective threshold. In this way, several different radio units 111, 112, 113 may transmit the FD data to the central control unit 110 which improves the probability that the signal will be received. At the same time, only data transmitted representing UEs 121, 122, 123 with a sufficient energy will be transmitted to the central control unit 110, thereby reducing the load on the front-haul. Thus, In this case of UL CoMP, the UL front-haul may only be loaded with I/Q data from secondary sectors which have enough transmission energy. With the radio units 111, 112, 113 serving a primary and/or secondary sector is herein meant that the radio units 111, 112, 113 may receive data from UEs 121, 122, 123 transmitting within the respective primary and/or secondary sector. The sectors may thus be considered a property of the UE 121, 122, 123 in the sense that the UE 121, 122, 123 is transmitting in a certain sector.

According to some of these embodiments, the configuration for configuring the radio units 111, 112, 113 further comprises to configure the secondary radio units 112 to send FD data with a lower packet priority than the primary radio unit 111. This is an advantage because the primary sector FD data is more important than the FD data from the secondary sectors, and assigning higher priority to a packet reduces the probability that it is dropped in the switches of the fronthaul. One reason to prioritize packets from primary sectors is that the signal-to-interference ratio is generally higher in the primary sector than in the secondary sectors.

Action 602.

The central control unit 110 may according to some embodiments send a request for FD data representing the respective one or more UEs 121, 122, 123 to the at least one radio unit 111, 112, 113 in order to perform demodulation and decoding of the data transmitted by individual UEs 121, 122, 123.

When the communications network 100 utilizes CoMP as described above, the central control unit 110 may send a request for FD data representing the respective one or more UEs 121, 122, 123 to the respective primary radio unit 111 and the one or more secondary radio units 112.

Thus, since both the primary radio unit 111 and the one or more secondary radio units 112 have received a request for FD data representing the one or more UEs 121, 122, 123 the probability that a transmission signal from the one or more UEs 121, 122, 123 is detected is increased e.g. when the FD data contributions from the different sectors are jointly processed in the receiver on the central control unit 110, resulting in a better signal-to-noise ratio.

Action 603.

When the at least one radio unit 111, 112, 113 is configured appropriately, it will send uplink data to the central control unit 110 when the energy criteria is fulfilled.

Thus, the central control unit 110 receives the FD data representing the respective at least one radio unit 111, 112, 113, when the at least one radio unit 111, 112, 113 detects that the uplink transmission energy from the one or more UEs 121, 122, 123 is above the first threshold.

When the communications network 100 utilizes CoMP as described under action 501 above, the central control unit 110 may receive the FD data representing the respective any one or more out of the primary radio unit 111 and the at least one secondary radio unit 112 when any one or more out of the primary radio unit 111 and the at least one secondary radio unit 112 detects that the one or more UEs 121, 122, 123 have an uplink transmission energy above the first threshold.

Action 604.

In the same manner as for action 403 above, the at least one radio unit 111, 112, 113 will not send FD data to the control unit 110 when the energy criteria is not fulfilled. Instead a message is sent indicating that no FD data will be received.

Thus, the central control unit 110 receives a message from the respective at least one radio unit 111, 112, 113, which message indicates that no FD data will be sent to the central control unit 110, when the at least one radio unit 111, 112, 113 detects that the uplink transmission energy from the one or more UEs 121, 122, 123 is below the first threshold.

When the communications network 100 utilizes CoMP as described under action 501 above, and when any one or more out of the primary radio unit 111 and the at least one secondary radio unit 112 detects that the one or more UEs 121, 122, 123 have an uplink transmission energy below the first threshold the central control unit 110 may receive a message from the respective any one or more out of the primary radio unit 111 and the at least one secondary radio unit 112, which message indicates that no FD data will be sent to the central control unit 110.

UEs 121, 122, 123 being scheduled in spite of having actual data to transmit will become more common when IUA is enabled in low loaded cells. This is because the transmission scheduler will grant the UEs 121, 122, 123 connected to radio units 111, 112, 113 pre-emptively, also referred to as speculatively, in order to reduce the UL access latency. Thus, the advantage of following the method above will become even more pronounced in such cases.

Further advantages of embodiments herein comprises at least:

If the front-haul is switched, implying that many radio units 111, 112, 113 are pooled over a switched front-haul network 1, the load reduction may be used for dimensioning the aggregated capacity of the network 1 at a lower capacity by accounting for statistical multiplexing effects. The UL transmissions can at the same time be scheduled across the full air interface BW available in the system. Thus, infrastructure savings may be accomplished while at the same time achieving low connection latency and high network performance The methods described above will now be further explained and exemplified.

Figure 7:
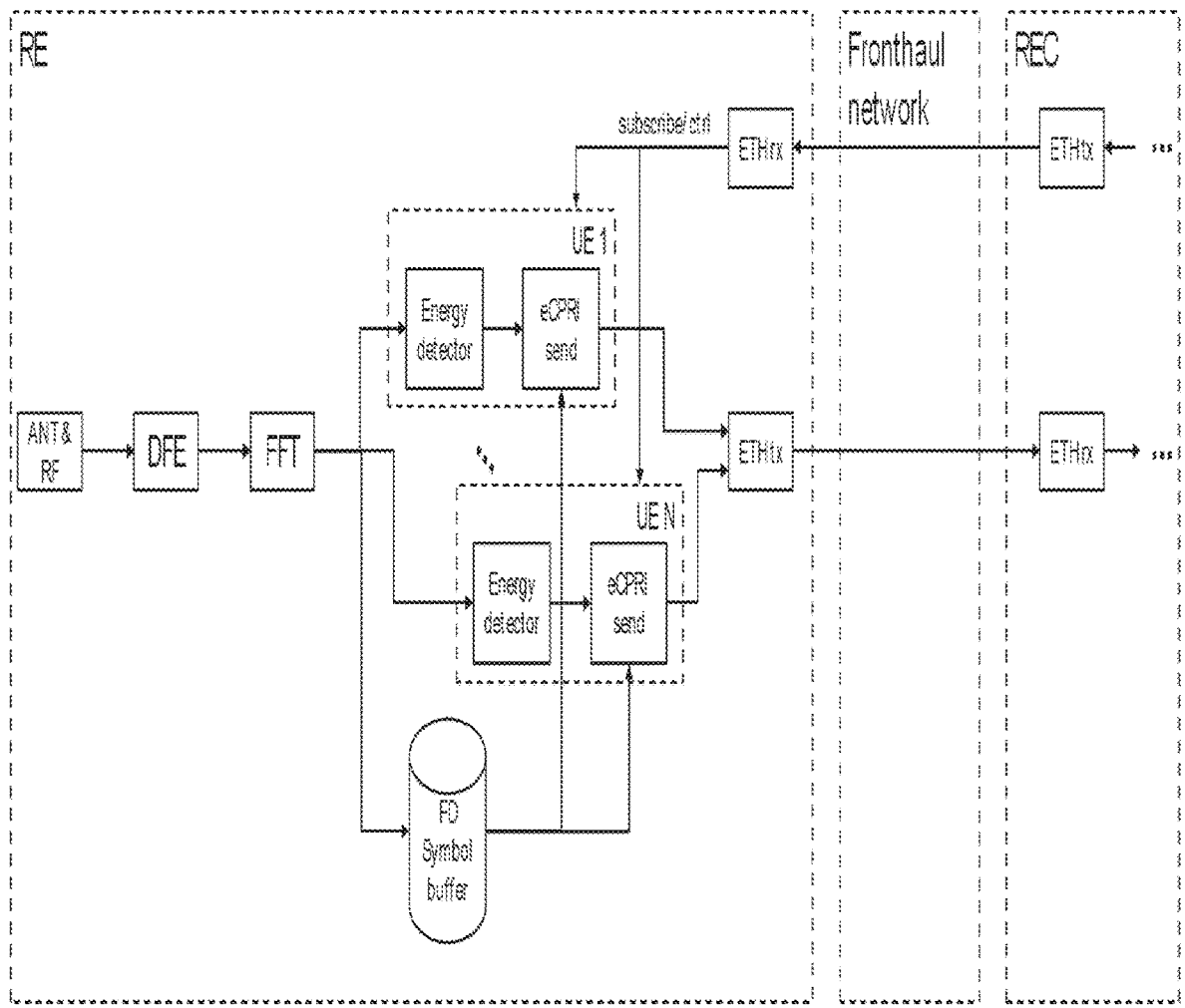
FIG. 7 is a schematic block diagram illustrating embodiments of a radio unit and a central control unit.

FIG. 7 shows a block diagram illustrating how all scheduled uplink transmissions, e.g. PUSCH transmission, for a given slot, are matched with an energy detector in the radio unit 111, 112, 113. As has been described above, only transmission from the one or more UEs 121, 122, 123 having an uplink transmission energy above the first threshold is transmitted over the eCPRI to the central control unit 110. Thus, in a special case of the transmission being a PUSCH transmission, if the detected energy is above the first threshold, the particular RBs that the PUSCH is scheduled on are transmitted over the eCPRI for all symbols and antennas of that slot and carrier respectively.

The energy detection may be based on one or more of several techniques, e.g.:

Absolute energy, also called raw energy herein, $\Sigma(I^2+Q^2)$, summed over the RBs over all antennas, on one or more OFDM symbol(s).

Matched filter energy over the Demodulation Reference Signal (DMRS) symbol, i.e. received DMRS resource elements multiplied by the known DMRS sequence.

Energy after full channel estimation based on DMRS symbol.

In FIG. 7 the basic PUSCH energy based eCPRI transmission scheme is shown. The radio signal received by the at least one radio unit 111, 112, 113 may be fed from antennas and RF components of the at least one radio unit 111, 112, 113 via the digital frontend to the baseband processor located at the central control unit 110. The signal from each of the antenna elements is transformed using a FFT on a per-OFDM-symbol basis and stored in a FD symbol buffer. As described above, the UE 121, 122, 123 energy detection functionality may have been configured in advance, e.g. via subscription or control signaling. For each UE 121, 122, 123, the FD data is processed by an energy detector specific for a UE 121, 122, 123, i.e. an energy detector dedicated to a specific UE 121, 122, 123 being served by the at least one radio unit 111, 112, 113. The UE-relevant symbol data is sent on eCPRI for all UEs 121, 122, 123 detected to transmit with an uplink transmission energy above the first threshold. For the UEs 121, 122, 123 transmitting with too low energy, a message indicating that no FD data will be sent representing the respective UE 121, 122, 123 is transmitted instead. The message may e.g. be a DTX signal.

Figure 8:
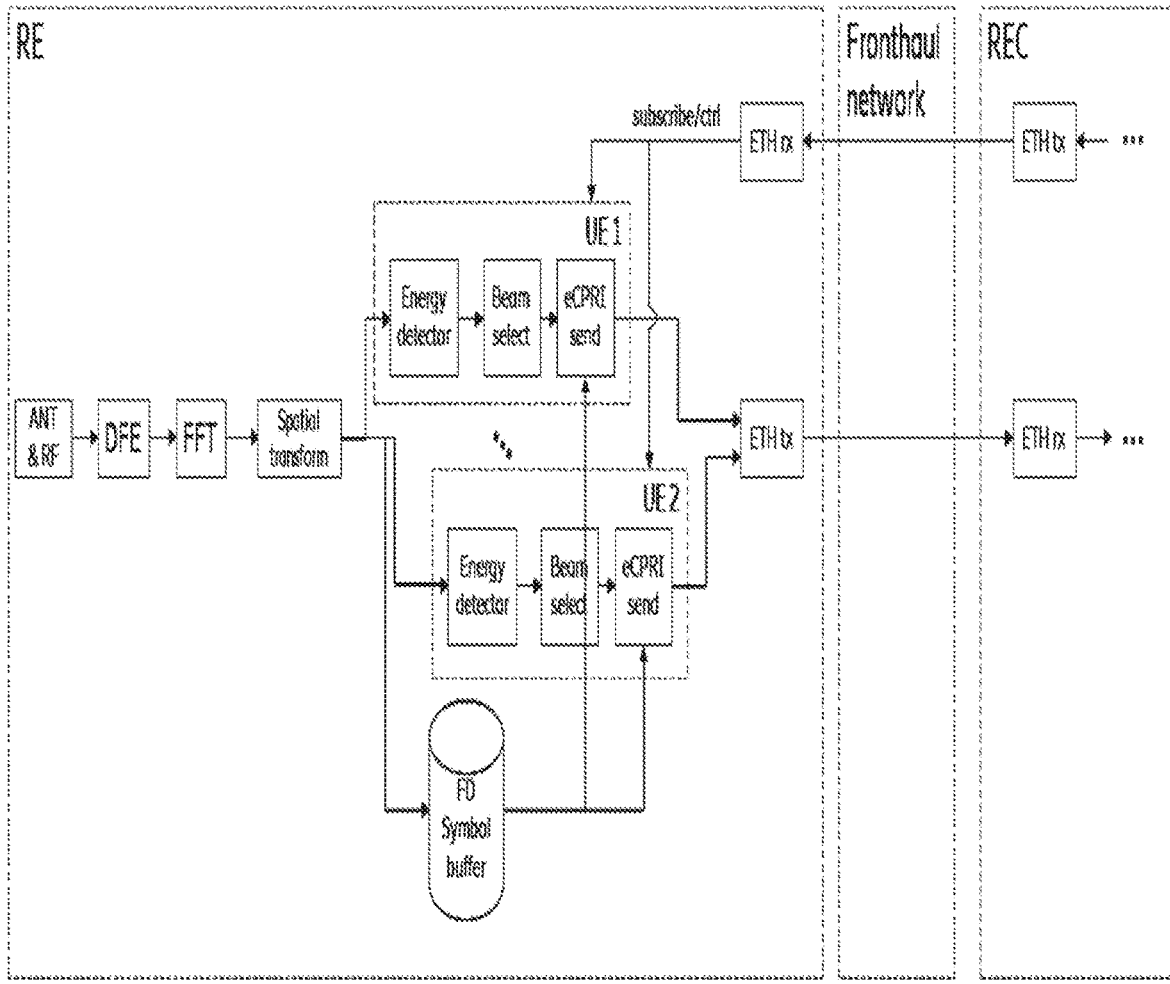
FIG. 8 is a schematic block diagram illustrating embodiments of a radio unit and a central control unit.

FIG. 8 shows a block diagram showing an embodiment where the per-antenna FD data is transformed into per-direction FD data by use of a spatial transform carried out on a sub-carrier by sub-carrier basis. The transform could e.g. be a spatial DFT. Normally the transform will focus the PUSCH energy into a subset of the direction beams. The subsequent energy detector, now working per direction, can identify which beams, if any, have an energy above the threshold for a given PUSCH transmission. This information is then used by the beam selector to decide which direction beam subset that should be sent to the PUSCH receiver in the central control unit 110.

Thus, here the at least one radio unit 111, 112, 113 may be an Advanced Antenna System (AAS) capable of performing a transformation of the detected transmission from an antenna space to a beam space. The at least one radio unit 111, 112, 113 may then determine one or more beams corresponding to detected uplink transmission energy from the one or more UEs 121, 122, 123. Thereafter the radio unit 111, 112, 113 may decide whether the detected uplink transmission energy of any one or more of the one or more beams is above or below the first threshold. Finally, the radio unit 111, 112, 113 may send only FD data to the central control unit 110 representing the one or more beams for which the detected uplink transmission energy is above the first threshold.

Figure 9:
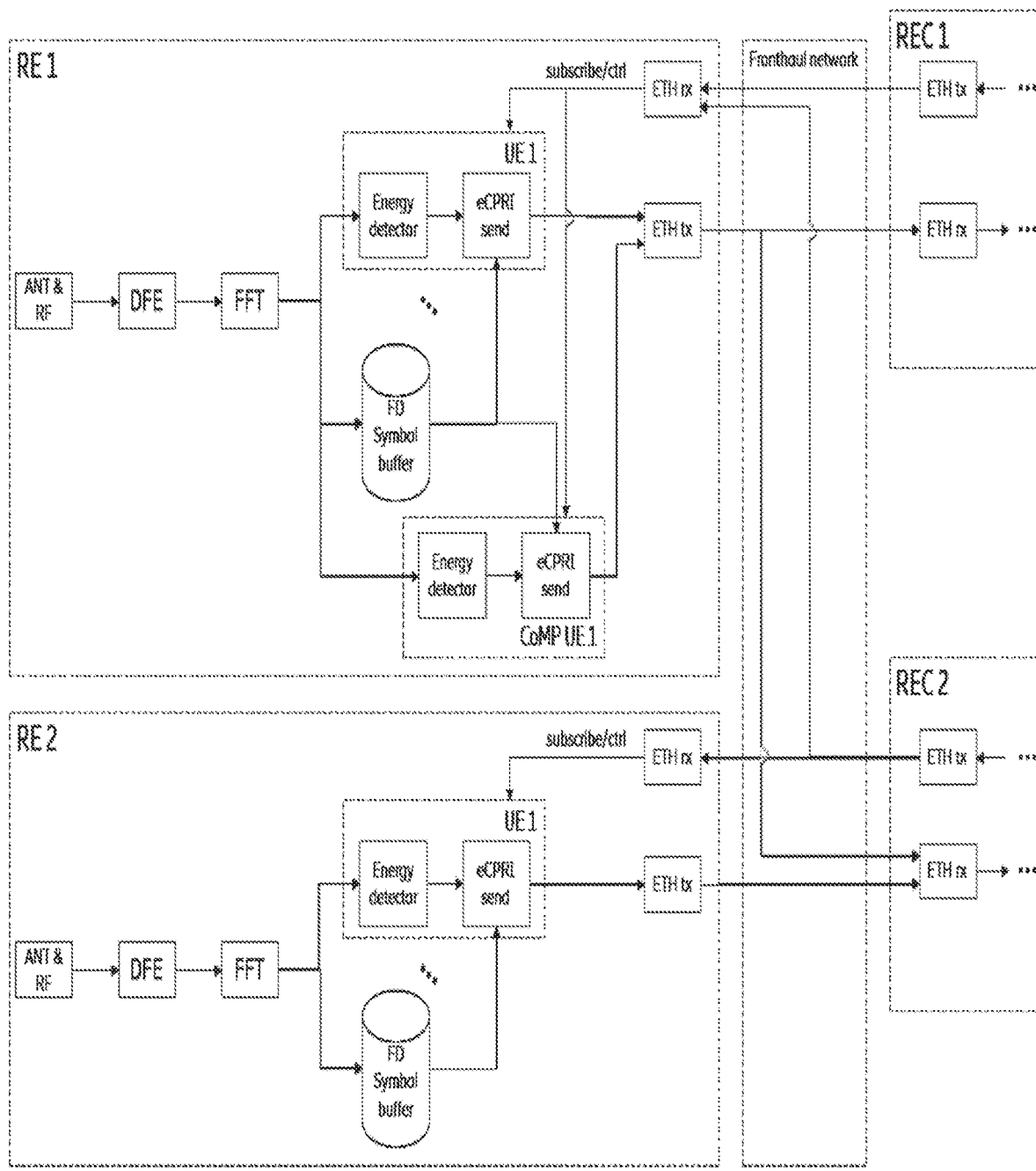
FIG. 9 is a schematic block diagram illustrating embodiments of a radio unit and a central control unit.

FIG. 9 shows a block diagram illustrating an embodiment where the network 100 uses UL CoMP and packet-based front-haul. The RECs correspond to central control units 110 and the REs correspond to radio units 111, 112, 113. REC 1 represents the main client for RE 1, i.e. the central control unit 110 which uses the radio unit 1 as main radio unit 1. Thus, REC 1 may request PUSCH data from RE 1. REC 2 has one of its primary sectors serviced by RE 2 and may thus request PUSCH data from RE 2. One or more UEs 121, 122, 123 serviced by REC 2 has a secondary UL CoMP sector realized by RE 1. Thus, here the PUSCH receiver in REC 2 may request data from both RE 2 as its primary radio unit, and RE 1 as its secondary radio unit. RE 1 then sets up an energy detector for the CoMP UE 121, 122, 123, and will attempt to send data to REC 2 if the energy detector detects transmission energy from the UE 121, 122, 123 above the first threshold. The data may be sent as best effort data, i.e. with a lower packet priority than regular non-CoMP UL data in order to not disturb the regular operation.

Figure 10A:
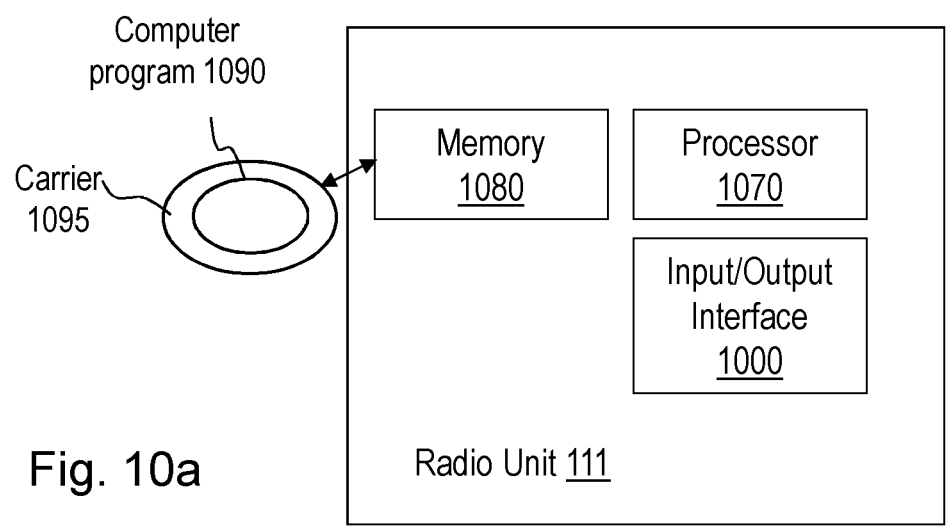
FIGS. 10a and 10b is a schematic block diagram illustrating embodiments of a radio unit.
Figure 10B:
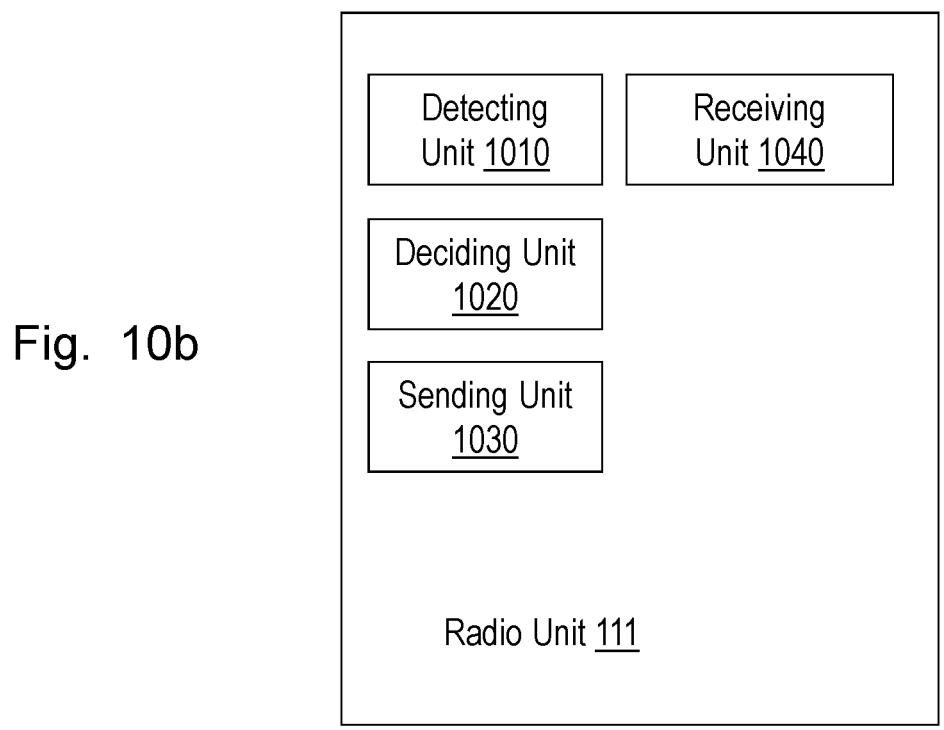

To perform the method actions above for handling FD data representing one or more UEs, 121, 122, 123 to a central control unit 110 associated with the radio unit 111 in a wireless communications network 100, the radio unit 111 may comprise the arrangement depicted in FIGS. 10a and 10b. The communications network 100 is adapted to comprise a switched front-haul and in some embodiments IUA.

The radio unit 111 may comprise an input and output interface 1000 configured to communicate e.g. with the one or more UEs 121, 122, 123 and the central control unit 110. The input and output interface 1000 may comprise a wireless receiver not shown and a wireless transmitter not shown.

The radio unit 111 is configured to, e.g. by means of a detecting unit 1010 in the radio unit 111, detect an uplink transmission energy from the one or more UEs 121, 122, 123.

The uplink transmission from the respective one or more UEs 121, 122, 123 may be adapted to be a PUSCH transmission.

The radio unit 111 is further configured to, e.g. by means of a deciding unit 1020 in the radio unit 111, whether the detected uplink transmission energy from the respective one or more UEs 121, 122, 123 is above or below a first threshold.

When it is decided that the detected uplink transmission energy from any of the one or more UEs 121, 122, 123 is above the first threshold, the radio unit 111 is further configured to, e.g. by means of a sending unit 1030 in the radio unit 111, send the FD data representing those respective one or more UEs 121, 122, 123 to the central control unit 110.

When it is decided that the detected uplink transmission energy from any of the one or more UEs 121, 122, 123 is below the first threshold, the radio unit 111 is further configured to, e.g. by means of the sending unit 1030 in the radio unit 111, send a message to the central control unit 110 which message is adapted to indicate that no FD data will be sent representing those respective one or more UEs 121, 122, 123, and refrain from sending the FD data representing those respective one or more UEs 121, 122, 123 to the central control unit 110.

According to some embodiments, the one or more UEs 121, 122, 123 may be adapted to be scheduled on the same set of RBs. The radio unit 111 may then, when it is decided that the detected uplink transmission energy from any of the one or more UEs 121, 122, 123 is above the first threshold, be further configured to, e.g. by means of the sending unit 1030 in the radio unit 111, send the FD data to the central control unit 110.

The radio unit 111 may further be configured to, e.g. by means of a receiving unit 1040 in the radio unit 111, receive from the central control unit 110 a configuration. The configuration is adapted for configuring the radio unit 111 to, when it is decided that the detected uplink transmission energy from any of the one or more UEs 121, 122, 123 is above a first threshold, send FD data to the central control unit 110 representing those respective one or more UEs 121, 122, 123. The configuration is further adapted for configuring the radio unit 111 to, when it is decided that the detected uplink transmission energy from any of the one or more UEs 121, 122, 123 is below the first threshold, send a message to the central control unit 110 which message adapted to indicate that no FD data will be sent representing those respective one or more UEs 121, 122, 123 to the central control unit 110 and refrain from sending the FD data representing those respective one or more UEs (121, 122, 123) to the central control unit 110.

The radio unit 111 may be further configured to, e.g. by means of the receiving unit 1040 in the radio unit 111, receive from the central control unit 110, a request for FD data representing the respective one or more UEs 121, 122, 123.

Figure 11A:
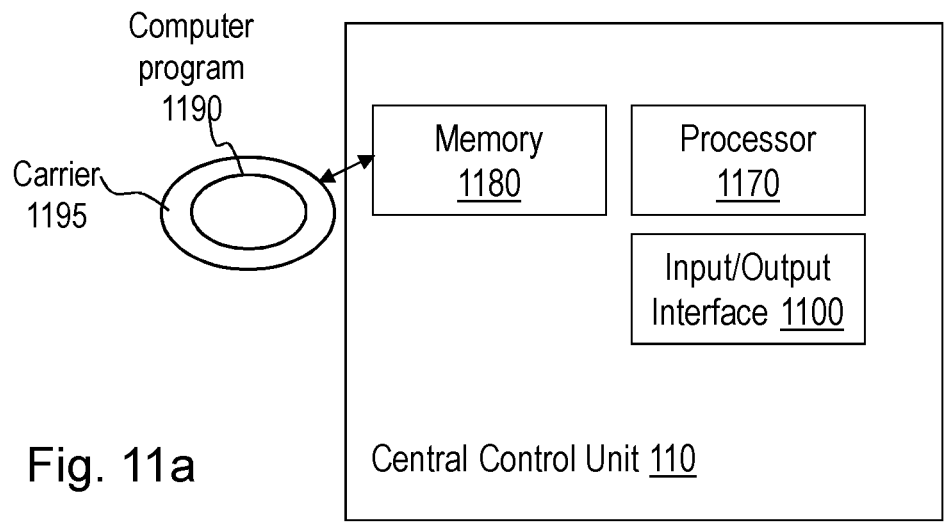
FIGS. 11a and 11b is a schematic block diagram illustrating embodiments of a central control unit.
Figure 11B:
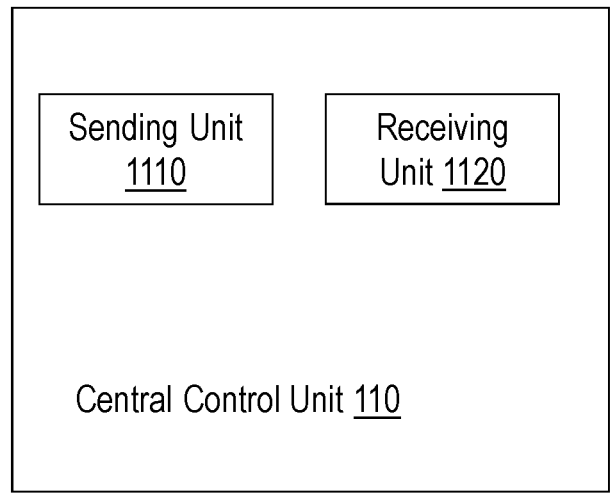

To perform the method actions above for handling FD data representing one or more UEs, 121, 122, 123 to a central control unit 110 in a wireless communications network 100, the central control unit 110 may comprise the arrangement depicted in FIGS. 11a and 11b. The communications network 100 is adapted to comprise a switched front-haul and in some embodiments IUA. The central control unit 110 is adapted to be associated with at least one radio unit 111, 112, 113. The central control unit 110 is further adapted to communicate via the at least one radio unit 111, 112, 113 with the one or more UEs 121, 122, 123.

The central control unit 110 may comprise an input and output interface 1100 configured to communicate e.g. with the at least one radio unit 11, 112, 113. The input and output interface 1100 may comprise a receiver not shown and a transmitter not shown.

The central control unit 110 is configured to, e.g. by means of a sending unit 1110 in the central control unit 110, send to the respective at least one radio unit 111, 112, 113 a configuration. The configuration is adapted for configuring the respective at least one radio unit 111, 112, 113 to, when it is decided that a detected uplink transmission energy from any of the one or more UEs 121, 122, 123 is above a first threshold, send the FD data representing those respective one or more UEs 121, 122, 123 to the central control unit 110. The configuration is further adapted for configuring the respective at least one radio unit 111, 112, 113 to, when it is decided that a detected uplink transmission energy from any of the one or more UEs 121, 122, 123 is below the first threshold, send a message to the central control unit 110, which message is adapted to indicate that no FD data will be sent representing those respective one or more UEs 121, 122, 123 to the central control unit 110 and refrain from sending the FD data representing those respective one or more UEs 121, 122, 123 to the central control unit 110.

The one or more UEs 121, 122, 123 may be adapted to be scheduled on the same set of RBs. Then, the configuration is further adapted for configuring the respective at least one radio unit 111, 112, 113 to, when it is decided that the detected uplink transmission energy from any of the one or more UEs 121, 122, 123 is above the first threshold, send the FD data to the central control unit 110.

The central control unit 110 may further be configured to, when the at least one radio unit 111, 112, 113 detects that the uplink transmission energy from the one or more UEs 121, 122, 123 is above a first threshold receive, e.g. by means of a receiving unit 1120 in the central control unit 110, the requested FD data representing the respective at least one radio unit 111, 112, 113. The central control unit 110 is then further configure to, when the at least one radio unit 111, 112, 113 detects that the uplink transmission energy from the one or more UEs 121, 122, 123 is below the first threshold, receive, e.g. by means of the receiving unit 1120 in the central control unit 110, a message from the respective at least one radio unit 111, 112, 113, which message is adapted to indicate that no FD data will be sent to the central control unit 110.

The communications network 100 may according to some embodiments be adapted to utilize CoMP. Then the at least one radio unit 111, 112, 113 comprises a plurality of radio units 111, 112, 113. A primary radio unit 111 out of the plurality of radio units 111, 112, 113 is then adapted to serve a primary sector for the central control unit 110 and one or more secondary radio units 112 out of the plurality of radio units 111, 112, 113 are adapted to serve one or more secondary sectors for the central control unit 110. To send to the at least one radio unit 111, 112, 113 a configuration adapted for configuring the radio unit 111, 112, 113 then comprises to send to the primary radio unit 111 and the one or more secondary radio units 112 a respective configuration. The configuration is then adapted for configuring the primary radio unit 111 and the one or more secondary radio units 112 to send FD data to the central control unit 110 when it is decided that a detected uplink transmission energy from the one or more UEs 21, 122, 123 is above a respective threshold associated with the radio unit 111, 112, 113. The configuration is then further adapted for configuring the primary radio unit 111 and the one or more secondary radio units 112 to send a message to the central control unit 110 and refrain from sending the FD data to the central control unit 110, when it is decided that the detected uplink transmission energy from the one or more UEs 121, 122, 123 is below the respective threshold. The message is adapted to indicate that no FD data will be sent to the central control unit 110.

The configuration adapted for configuring the radio units 111, 112, 113 may further be adapted to configure the secondary radio units 112 to send FD data with a lower packet priority than the primary radio unit 111.

The central control unit 110 may further be configured to when any one or more out of the primary radio unit 111 and the at least one secondary radio unit 112 detects that the one or more UEs 121, 122, 123 have an uplink transmission energy above a first threshold, e.g. by means of the receiving unit 1120 in the central control unit 110, receive the FD data from the respective any one or more out of the primary radio unit 111 and the at least one secondary radio unit 112. The central control unit 110 is then also configured to when any one or more out of the primary radio unit 111 and the at least one secondary radio unit 112 detects that the one or more UEs 121, 122, 123 have an uplink transmission energy below the first threshold, e.g. by means of the receiving unit 1120 in the central control unit 110, receive a message from the respective any one or more out of the primary radio unit 111 and the at least one secondary radio unit 112. The message is adapted to indicate that no FD data will be sent to the central control unit 110.

The central control unit 110 may further be configured to, e.g. by means of the sending unit 1110 in the central control unit 110, send to the at least one radio unit 111, 112, 113, a request for FD data representing the respective one or more UEs 121, 122, 123.

To send a request for FD data representing the respective one or more UEs 121, 122, 123 may further comprise to send a request for FD data representing the respective one or more UEs 121, 122, 123 to the respective primary radio unit 111 and the one or more secondary radio units 112.

The embodiments herein may be implemented through a respective processor or one or more processors, such as a processor 1070 of a processing circuitry in the radio unit 111 depicted in FIG. 10 and a processor 1170 of a processing circuitry in the central control unit 110 depicted in FIG. 11, together with respective computer program code for performing the functions and actions of the embodiments herein. The program code mentioned above may also be provided as a computer program product, for instance in the form of a data carrier carrying computer program code for performing the embodiments herein when being loaded into the radio unit 111 and/or the central control unit 110. One such carrier may be in the form of a CD ROM disc. It is however feasible with other data carriers such as a memory stick. The computer program code may furthermore be provided as pure program code on a server and downloaded to the radio unit 111 and/or the central control unit 110.

The radio unit 111 and/or the central control unit 110 may further comprise a memory 1080, 1180 comprising one or more memory units. The respective memory 1080, 1180 comprises instructions executable by the respective processor in the radio unit 111 and the central control unit 110.

The memory 1080, 1180 is arranged to be used to store e.g. data, configurations, and applications to perform the methods herein when being executed in the respective radio unit 111 and/or central control unit 110.

In some embodiments, a respective computer program 1090, 1190 comprises instructions, which when executed by the respective at least one processor 1070, 1170, cause the at least one processor of the radio unit 111 and/or the central control unit 110 to perform the actions above.

In some embodiments, a respective carrier 1095, 1195 comprises the respective computer program, wherein the carrier is one of an electronic signal, an optical signal, an electromagnetic signal, a magnetic signal, an electric signal, a radio signal, a microwave signal, or a computer-readable storage medium.

Further Extensions and Variations

Figure 12:
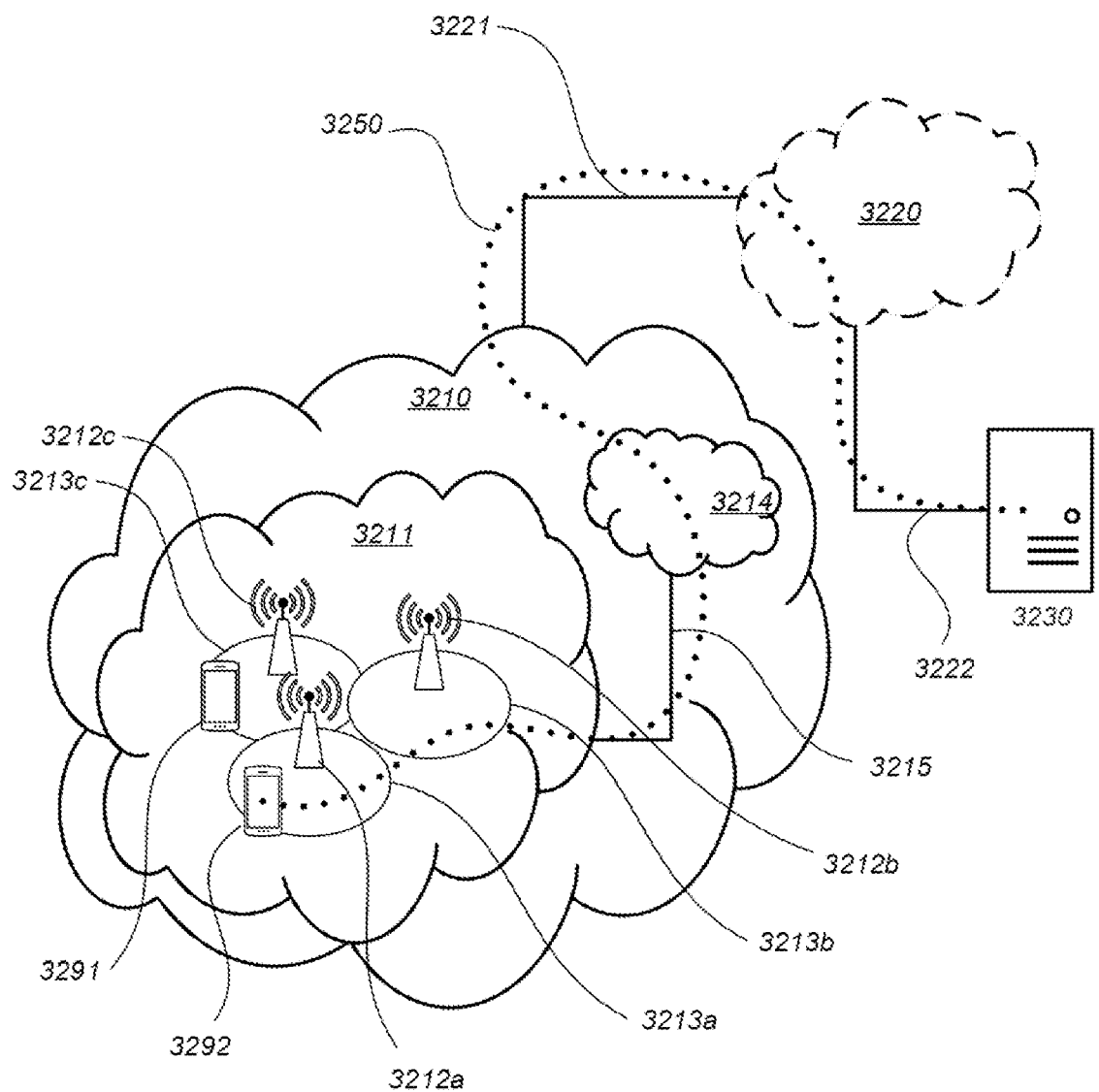
FIG. 12 schematically illustrates a telecommunication network connected via an intermediate network to a host computer.

With reference to FIG. 12, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the central control unit, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 121 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 13:
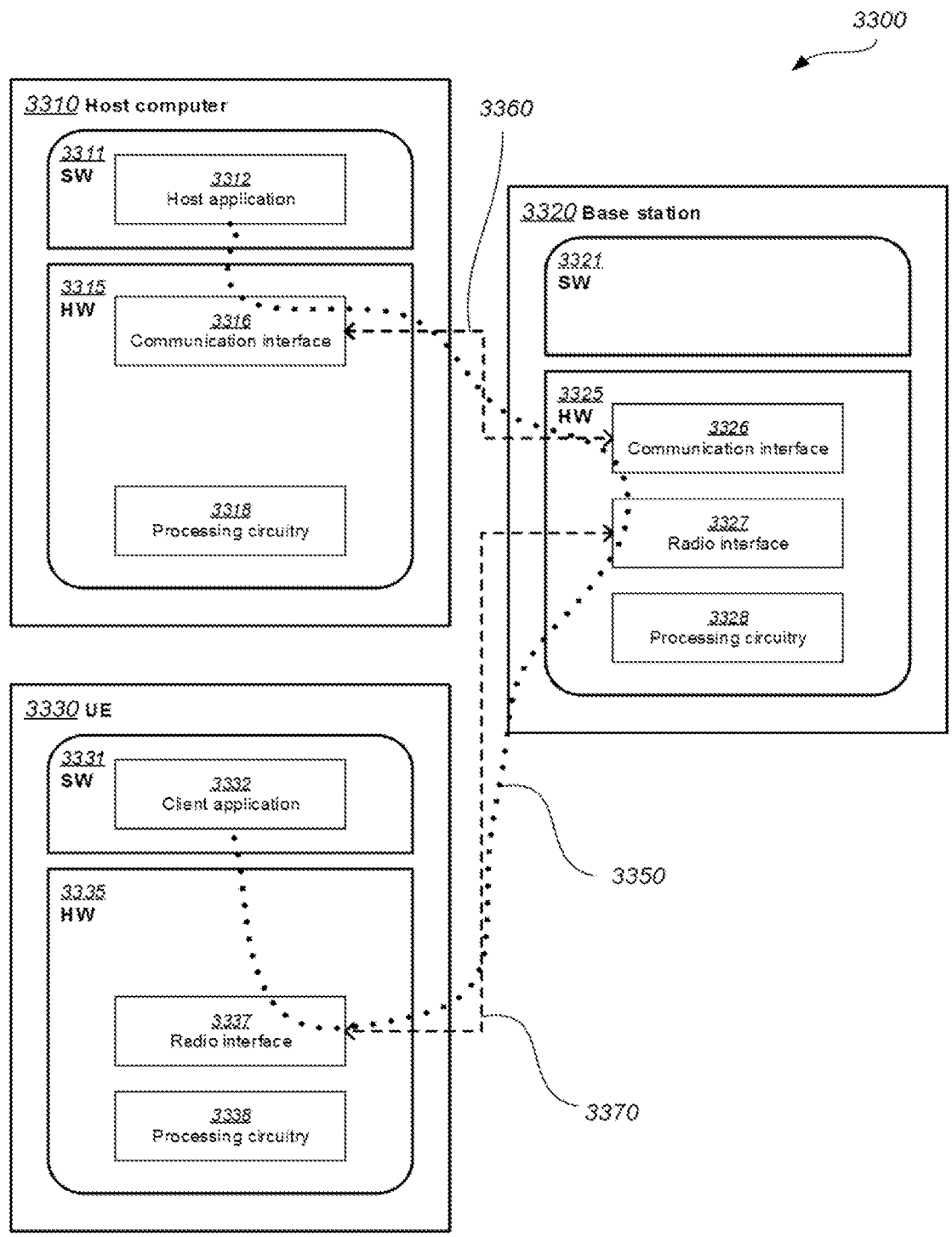
FIG. 13 is a generalized block diagram of a host computer communicating via a base station with a user equipment over a partially wireless connection.

It is noted that the host computer 3310, base station 3320 and UE 3330 illustrated in FIG. 13 may be identical to the host computer 3230, one of the base stations 3212a, 3212b, 3212c and one of the UEs 3291, 3292 of FIG. 12, respectively. This is to say, the inner workings of these entities may be as shown in FIG. 13 and independently, the surrounding network topology may be that of FIG. 12.

In FIG. 13, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 14 is a flowchart illustrating a method implemented in a communication system, in accordance with one embodiment. The communication system includes a host computer, a base station such as the central control unit 110, and a UE such as the UE 121, which may be those described with reference to FIG. 12 and FIG. 13. For simplicity of the present disclosure, only drawing references to FIG. 14 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 12 and FIG. 13. For simplicity of the present disclosure, only drawing references to FIG. 15 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 16 is a flowchart illustrating a method implemented in a communication system, in accordance with one embodiment. The communication system includes a host computer, a base station such as a AP STA, and a UE such as a Non-AP STA which may be those described with reference to FIG. 12 and FIG. 13. For simplicity of the present disclosure, only drawing references to FIG. 16 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station such as a AP STA, and a UE such as a Non-AP STA which may be those described with reference to FIG. 12 and FIG. 13. For simplicity of the present disclosure, only drawing references to FIG. 17 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed in a radio unit for handling Frequency Domain, FD, data representing one or more User Equipments, UEs, to a central control unit associated with the radio unit in a wireless communications network, which communications network comprises a switched fronthaul, the method comprising:
   detecting an uplink transmission energy from the one or more UEs,
   deciding whether the detected uplink transmission energy from the respective one or more UEs is above or below a first threshold,
   when it is decided that the detected uplink transmission energy from any of the one or more UEs is above the first threshold, sending the FD data representing those respective one or more UEs to the central control unit, and
   when it is decided that the detected uplink transmission energy from any of the one or more UEs is below the first threshold, sending a message to the central control unit which message indicates that no FD data will be sent representing those respective one or more UEs, and refraining from sending the FD data representing those respective one or more UEs to the central control unit.

2. The method according to claim 1, wherein the one or more UEs are scheduled on the same set of Resource Blocks, RBs, and wherein:
   when it is decided that the detected uplink transmission energy from any of the one or more UEs is above the first threshold, sending the FD data to the central control unit.

3. The method according to claim 1, further comprising:
   receiving from the central control unit a configuration for configuring the radio unit to:
      when it is decided that the detected uplink transmission energy from any of the one or more UEs is above a first threshold, send FD data to the central control unit representing those respective one or more UEs, when it is decided that the detected uplink transmission energy from any of the one or more UEs is below the first threshold, send a message to the central control unit, which message indicates that no FD data will be sent representing those respective one or more UEs to the central control unit and refrain from sending the FD data representing those respective one or more UEs to the central control unit.

4. A method performed in a central control unit for handling FD data representing one or more User Equipments, UEs, to the central control unit in a wireless communications network, which communications network comprises a switched fronthaul, wherein the central control unit is associated with at least one radio unit, and which central control unit communicates via the at least one radio unit with the one or more UEs, the method comprising:
sending to the respective at least one radio unit a configuration for configuring the respective at least one radio unit to:
when it is decided that a detected uplink transmission energy from any of the one or more UEs is above a first threshold, send the FD data representing those respective one or more UEs to the central control unit,
when it is decided that a detected uplink transmission energy from any of the one or more UEs is below the first threshold, send a message to the central control unit, which message indicates that no FD data will be sent representing those respective one or more UEs to the central control unit and refrain from sending the FD data representing those respective one or more UEs to the central control unit.

5. The method according to claim 4, wherein the one or more UEs are scheduled on the same set of Resource Blocks, RBs, and wherein:
when it is decided that the detected uplink transmission energy from any of the one or more UEs is above the first threshold, send the FD data to the central control unit.

6. The method according to claim 4, the method further comprising:
when the at least one radio unit detects that the uplink transmission energy from the one or more UEs is above the first threshold, receiving the FD data representing the respective at least one radio unit,
when the at least one radio unit detects that the uplink transmission energy from the one or more UEs is below the first threshold, receiving a message from the respective at least one radio unit, which message indicates that no FD data will be sent to the central control unit.

7. The method according to claim 4, wherein the communications network utilizes Coordinated Multi-Point reception, CoMP, wherein the at least one radio unit comprises a plurality of radio units, wherein a primary radio unit out of the plurality of radio units serves a primary sector for the central control unit and one or more secondary radio units out of the plurality of radio units serves one or more secondary sectors for the central control unit, and wherein sending to the at least one radio unit a configuration for configuring the radio unit comprises:
sending to the primary radio unit and the one or more secondary radio units a respective configuration for configuring the primary radio unit and the one or more secondary radio units to:
send FD data to the central control unit when it is decided that a detected uplink transmission energy from the one or more UEs is above a respective threshold associated with the radio unit,
send a message to the central control unit, which message indicates that no FD data will be sent to the central control unit and refrain from sending the FD data to the central control unit, when it is decided that the detected uplink transmission energy from the one or more UEs is below the respective threshold.

8. The method according to claim 4, further comprising:
when any one or more out of the primary radio unit and the at least one secondary radio unit detects that the one or more UEs have an uplink transmission energy above a first threshold, receiving the FD data representing the respective any one or more out of the primary radio unit and the at least one secondary radio unit,
when any one or more out of the primary radio unit and the at least one secondary radio unit detects that the one or more UEs have an uplink transmission energy below the first threshold, receiving a message from the respective any one or more out of the primary radio unit and the at least one secondary radio unit, which message indicates that no FD data will be sent to the central control unit.

9. The method according to claim 4, further comprising:
sending to the at least one radio unit, a request for FD data representing the respective one or more UEs.

10. A radio unit for handling Frequency Domain, FD, data representing one or more User Equipments, UEs, to a central control unit associated with the radio unit in a wireless communications network, which communications network is adapted to comprise a switched fronthaul, the radio unit being configured to:
detect an uplink transmission energy from the one or more UEs,
decide whether the detected uplink transmission energy from the respective one or more UEs is above or below a first threshold,
when it is decided that the detected uplink transmission energy from any of the one or more UEs is above the first threshold, send the FD data representing those respective one or more UEs to the central control unit, and
when it is decided that the detected uplink transmission energy from any of the one or more UEs is below the first threshold, send a message to the central control unit which message is adapted to indicate that no FD data will be sent representing those respective one or more UEs, and refrain from sending the FD data representing those respective one or more UEs to the central control unit.

11. The radio unit according to claim 10, wherein the one or more UEs are adapted to be scheduled on the same set of Resource Blocks, RBs, and wherein the radio unit is further configured to:
when it is decided that the detected uplink transmission energy from any of the one or more UEs is above the first threshold, send the FD data to the central control unit.

12. The radio unit according to claim 10, further being configured to:
receive from the central control unit a configuration adapted for configuring the radio unit to:
when it is decided that the detected uplink transmission energy from any of the one or more UEs is above a first threshold, send FD data to the central control unit representing those respective one or more UEs,
when it is decided that the detected uplink transmission energy from any of the one or more UEs is below the first threshold, send a message to the central control unit, which message adapted to indicate that no FD data will be sent representing those respective one or more UEs to the central control unit and refrain from sending the FD data representing those respective one or more UEs to the central control unit.

13. The radio unit according to claim 10, wherein the uplink transmission from the respective one or more UEs is adapted to be a Physical Uplink Shared Channel, PUSCH, transmission.

14. A central control unit for handling FD data representing one or more User Equipments, UEs, to the central control unit in a wireless communications network, which communications network and a switched fronthaul, wherein the central control unit is adapted to be associated with at least one radio unit, and which central control unit is adapted to communicate via the at least one radio unit with the one or more UEs, the central control unit being configured to:
send to the respective at least one radio unit a configuration adapted for configuring the respective at least one radio unit to:
when it is decided that a detected uplink transmission energy from any of the one or more UEs is above a first threshold, send the FD data representing those respective one or more UEs to the central control unit,
when it is decided that a detected uplink transmission energy from any of the one or more UEs is below the first threshold, send a message to the central control unit, which message is adapted to indicate that no FD data will be sent representing those respective one or more UEs to the central control unit and refrain from sending the FD data representing those respective one or more UEs to the central control unit.

15. The central control unit according to claim 14, wherein the communications network further is adapted to comprise Instant Uplink Access, IUA.

16. The central control unit according to claim 14, wherein the one or more UEs are adapted to be scheduled on the same set of Resource Blocks, RBs, and wherein:
when it is decided that the detected uplink transmission energy from any of the one or more UEs is above the first threshold, send the FD data to the central control unit.

17. The central control unit according to claim 14, further being configured to:
when the at least one radio unit detects that the uplink transmission energy from the one or more UEs is above a first threshold, receive the requested FD data representing the respective at least one radio unit,
when the at least one radio unit detects that the uplink transmission energy from the one or more UEs is below the first threshold, receive a message from the respective at least one radio unit, which message is adapted to indicate that no FD data will be sent to the central control unit.

18. The central control unit according to claim 14, wherein the communications network is adapted to utilize Coordinated Multi-Point reception, CoMP, wherein the at least one radio unit comprises a plurality of radio units, wherein a primary radio unit out of the plurality of radio units is adapted to serve a primary sector for the central control unit and one or more secondary radio units out of the plurality of radio units are adapted to serve one or more secondary sectors for the central control unit, and wherein to send to the at least one radio unit a configuration adapted for configuring the radio unit comprises:
send to the primary radio unit and the one or more secondary radio units a respective configuration adapted for configuring the primary radio unit and the one or more secondary radio units to:
send FD data to the central control unit when it is decided that a detected uplink transmission energy from the one or more UEs is above a respective threshold associated with the radio unit,
send a message to the central control unit, which message is adapted to indicate that no FD data will be sent to the central control unit and refrain from sending the FD data to the central control unit, when it is decided that the detected uplink transmission energy from the one or more UEs is below the respective threshold.

19. The central control unit according to claim 14, further being configured to:
when any one or more out of the primary radio unit and the at least one secondary radio unit detects that the one or more UEs have an uplink transmission energy above a first threshold, receive the FD data from the respective any one or more out of the primary radio unit and the at least one secondary radio unit,
when any one or more out of the primary radio unit and the at least one secondary radio unit detects that the one or more UEs have an uplink transmission energy below the first threshold, receive a message from the respective any one or more out of the primary radio unit and the at least one secondary radio unit, which message is adapted to indicate that no FD data will be sent to the central control unit.

20. The central control unit according to claim 14, further being configured to:
send to the at least one radio unit, a request for FD data representing the respective one or more UEs.

* * * * *